(12) United States Patent
Machida et al.

(10) Patent No.: US 12,464,214 B2
(45) Date of Patent: Nov. 4, 2025

(54) VEHICULAR CAMERA

(71) Applicant: PANASONIC INTELLECTUAL PROPERTY MANAGEMENT CO., LTD., Osaka (JP)

(72) Inventors: Satoru Machida, Kanagawa (JP); Shingo Kameyama, Hyogo (JP); Masayuki Yoshie, Aichi (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 15 days.

(21) Appl. No.: 18/431,699

(22) Filed: Feb. 2, 2024

(65) Prior Publication Data

US 2024/0276089 A1 Aug. 15, 2024

(30) Foreign Application Priority Data

Feb. 10, 2023 (JP) .................................. 2023-019138
Mar. 10, 2023 (JP) .................................. 2023-037613

(51) Int. Cl.
*H04N 23/57* (2023.01)
*H04N 23/51* (2023.01)

(52) U.S. Cl.
CPC ............ *H04N 23/57* (2023.01); *H04N 23/51* (2023.01)

(58) Field of Classification Search
CPC .............................. H04N 23/57; H04N 23/51
USPC ........................................................ 348/148
See application file for complete search history.

(56) References Cited

U.S. PATENT DOCUMENTS

| | | | |
|---|---|---|---|
| 2011/0096163 A1* | 4/2011 | Chen ................ | G08B 13/19626 348/143 |
| 2016/0317286 A1* | 11/2016 | Brady ................... | A61F 2/1648 |
| 2019/0007587 A1* | 1/2019 | Masui ..................... | H04N 23/55 |
| 2019/0143907 A1 | 5/2019 | Byrne et al. | |
| 2020/0059580 A1* | 2/2020 | Park .......................... | B60R 11/04 |
| 2020/0119474 A1* | 4/2020 | Owaki ................ | H01R 12/716 |
| 2020/0172019 A1* | 6/2020 | Ding ....................... | G03B 17/12 |
| 2020/0233176 A1* | 7/2020 | Feng ....................... | G02B 7/022 |
| 2020/0245462 A1* | 7/2020 | Kim ....................... | H05K 1/028 |
| 2021/0297596 A1* | 9/2021 | Enta ....................... | H04N 23/67 |
| 2021/0323485 A1* | 10/2021 | Kim ....................... | B60R 11/04 |
| 2022/0137391 A1* | 5/2022 | Jia ............................ | G02B 3/14 359/315 |

(Continued)

FOREIGN PATENT DOCUMENTS

JP 2018197798 A 12/2018
JP 3234888 U 11/2021

*Primary Examiner* — Matthew David Kim
(74) *Attorney, Agent, or Firm* — Seed Intellectual Property Law Group LLP

(57) ABSTRACT

A vehicular camera includes a lens barrel portion accommodating a lens, a welding ring disposed on an outer periphery of the lens barrel portion, a circuit board, an imaging element mounted on the circuit board, and a housing accommodating the imaging element and the circuit board. The welding ring includes a third surface, a fourth surface opposite to the third surface, and at least three protrusions. At least an end surface of the housing is fixed to a first fixing region of the fourth surface of the welding ring. On the third surface of the welding ring, each of the at least three protrusions of the welding ring is disposed closer to the lens barrel portion than a first fixing-corresponding region of the third surface corresponding to the first fixing region of the fourth surface.

9 Claims, 22 Drawing Sheets

(56) References Cited

U.S. PATENT DOCUMENTS

| | | | | |
|---|---|---|---|---|
| 2023/0164251 A1* | 5/2023 | Jung | ................. | G03B 11/00 |
| | | | | 455/556.1 |
| 2024/0027236 A1* | 1/2024 | Owaki | .............. | B29C 66/73921 |

\* cited by examiner

VEHICULAR CAMERA

CROSS-REFERENCE TO RELATED APPLICATIONS

This application is based on and claims priority under 35 USC 119 from Japanese Patent Applications No. 2023-019138 filed on Feb. 10, 2023 and No. 2023-037613 filed on Mar. 10, 2023, the entire contents of which are incorporated herein by reference.

TECHNICAL FIELD

The present disclosure relates to a vehicular camera.

BACKGROUND ART

In recent years, in response to demands for improvement in safety of a vehicle, introduction of an automated driving function, and the like, development of a vehicular camera that is mounted in a vehicle and images the inside and outside of the vehicle has become active (for example, see Patent Literatures 1, 2 and 3).

CITATION LIST

Patent Literature

Patent Literature 1: JP2018-197798A
Patent Literature 2: Japanese Utility Model Registration No. 3234888
Patent Literature 3: US 2019/0143907A

SUMMARY OF INVENTION

A level of demands related to the safety, the automated driving function, and the like, which are required for a vehicle, continues to increase, and further improvement in performance and the like are also required for the vehicular camera.

The present disclosure relates to a technique for providing a new vehicular camera.

The present disclosure provides a vehicular camera including at least one lens disposed along an optical axis; a lens barrel portion having a first tubular shape and accommodating the at least one lens; a planar flange extending in a direction away from the optical axis on an outer periphery of the lens barrel portion; a circuit board having a first surface and a second surface opposite to the first surface; an imaging element mounted on the first surface of the circuit board and disposed on the optical axis; and a housing at least partially having a second tubular shape and at least accommodating the imaging element and the circuit board. The flange is made of a first resin having a first light transmittance with respect to light having a predetermined wavelength, and includes a third surface, a fourth surface opposite to the third surface, and at least three protrusions protruding in a direction away from the fourth surface along an optical axis direction on the third surface. At least an end surface of the second tubular shape of the housing is made of a second resin having a second light transmittance smaller than the first light transmittance with respect to the light having the predetermined wavelength, and is fixed to a fixing region of the fourth surface of the flange. On the third surface of the flange, each of the at least three protrusions of the flange is disposed closer to the lens barrel portion than a fixing-corresponding region of the third surface corresponding to the fixing region of the fourth surface.

Further, the present disclosure provides a vehicular camera including a lens barrel portion accommodating at least one lens disposed along an optical axis; a circuit board having a first surface and a second surface opposite to the first surface; an imaging element disposed on the first surface of the circuit board and disposed on the optical axis; a housing to which the lens barrel portion is fixed, which accommodates at least the circuit board and is made of a resin; and a metal shield accommodated in the housing. The shield includes a first side surface portion disposed to be adjacent to a side wall inner surface of the housing, and extending in a direction along the optical axis, a second side surface portion disposed closer to the optical axis than the first side surface portion, and extending in the direction along the optical axis, and a connection portion connecting the first side surface portion and the second side surface portion. The vehicular camera further includes a first resin member disposed between the side wall inner surface of the housing and the second side surface portion. The first resin member is in contact with at least a part of each of the side wall inner surface of the housing and the second side surface portion.

According to the present disclosure, in the vehicular camera, the at least three protrusions are in contact with a part of the vehicle and a positional relation with the vehicle is defined, and therefore it is possible to eliminate an influence caused by a dimensional error between the vehicular camera and the part of the vehicle and to improve positioning accuracy of the vehicular camera.

According to the present disclosure, in the vehicular camera, the first resin member is in contact with at least a part of each of the side wall inner surface of the housing and the second side surface portion, and therefore heat generated by an electronic component such as the circuit board can be efficiently dissipated. Therefore, the function of the vehicular camera can be maintained. In particular, the function of the imaging element can be maintained.

DESCRIPTION OF EMBODIMENTS

Embodiment A

Hereinafter, embodiments that specifically disclose a vehicular camera according to the present disclosure will be described in detail with reference to the drawings as appropriate. However, unnecessarily detailed description may be omitted. For example, a detailed description of well-known matters and a redundant description of substantially the same configuration may be omitted. This is to avoid unnecessary redundancy of the following description and to facilitate understanding of those skilled in the art. It should be noted that the accompanying drawings and the following description are provided for those skilled in the art to fully understand the present disclosure, and are not intended to limit the subject matter described in the claims.

Figure 1A:
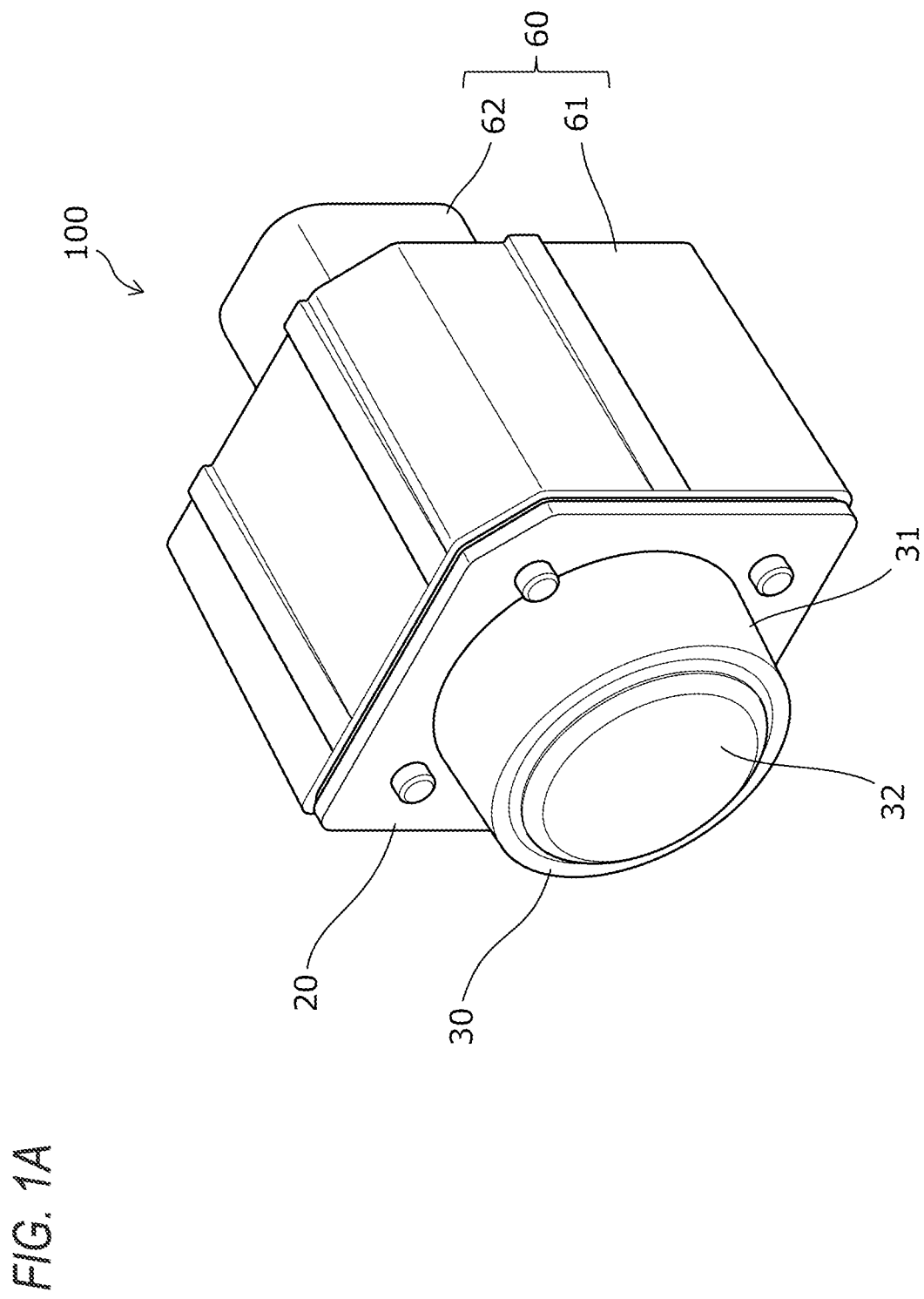
FIG. 1A is a top perspective view of a vehicular camera according to an embodiment A.
Figure 1B:
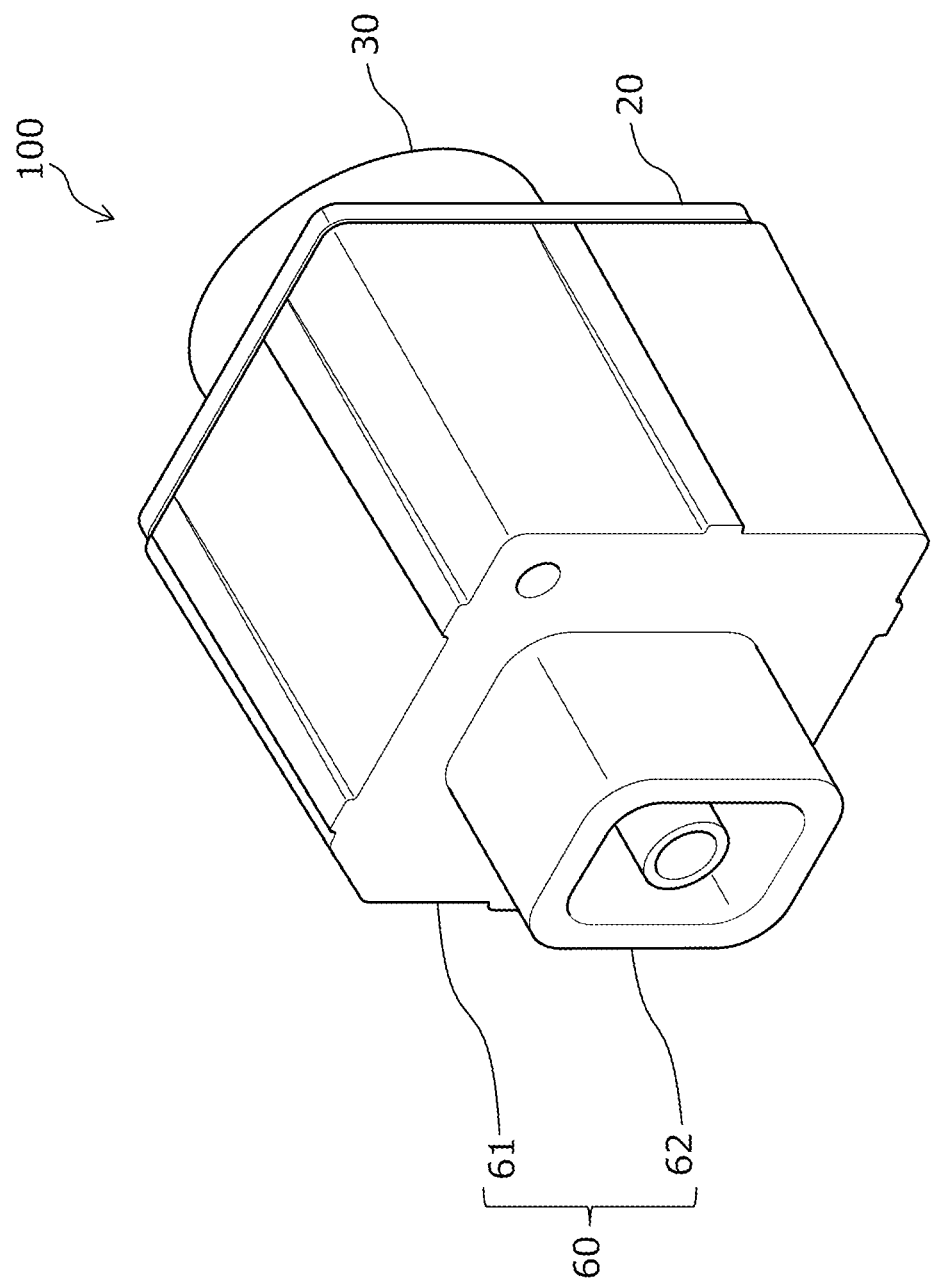
FIG. 1B is a bottom perspective view of the vehicular camera according to the embodiment A.
Figure 2:
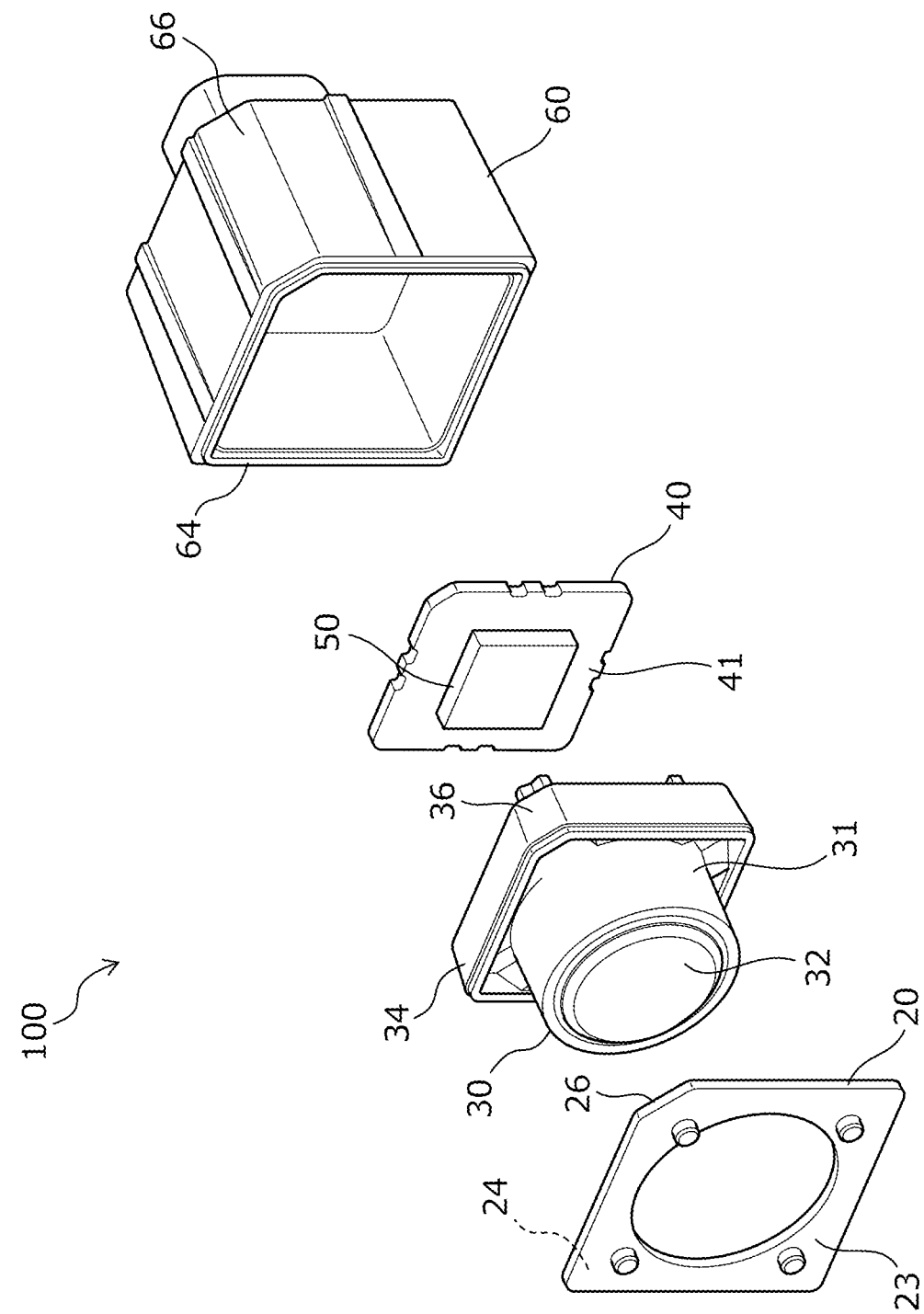
FIG. 2 is an exploded perspective view of the vehicular camera according to the embodiment A.
Figure 3:
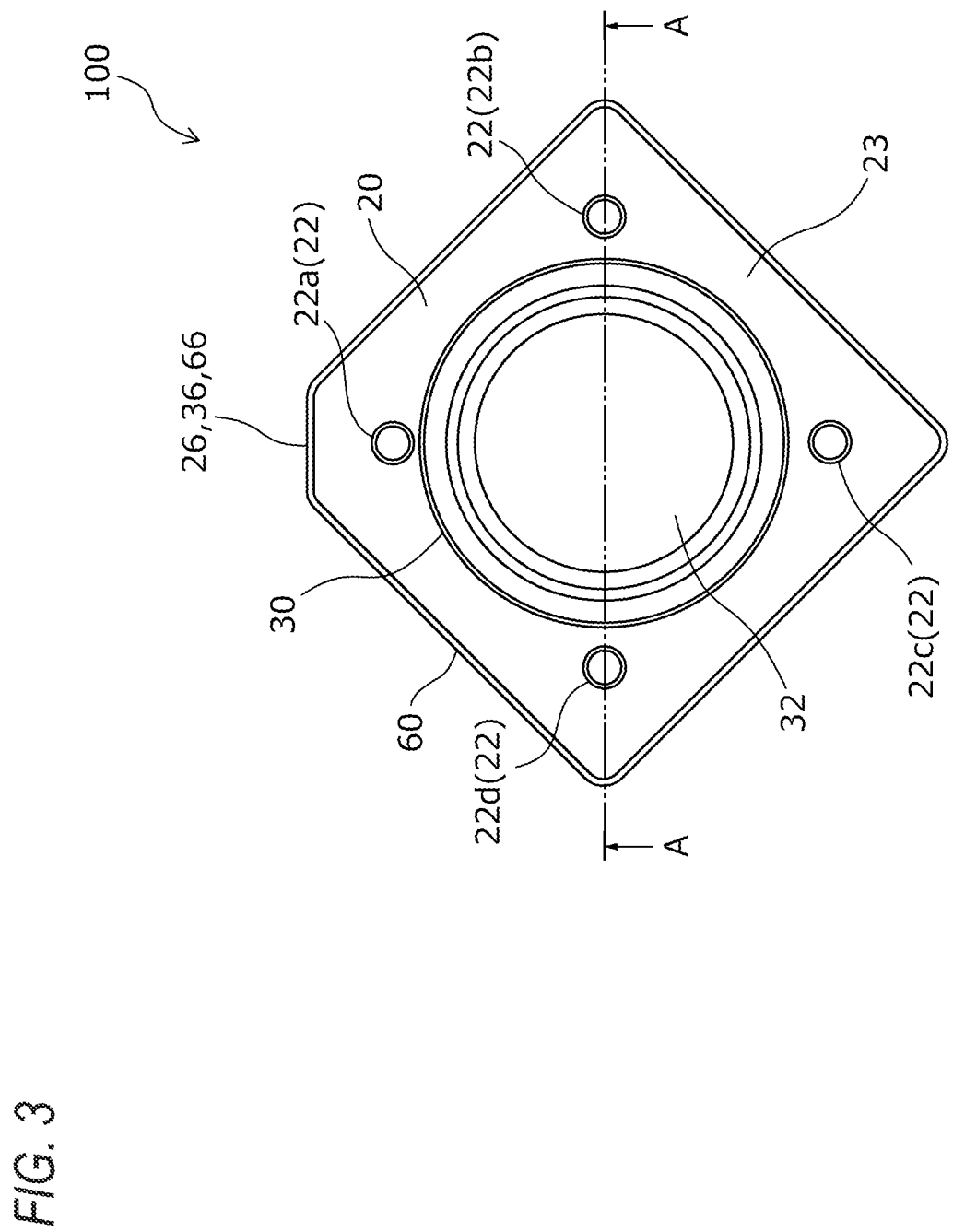
FIG. 3 is a top view of the vehicular camera according to the embodiment A.

FIG. 1A is a top perspective view of a vehicular camera 100 according to an embodiment A. FIG. 1B is a bottom perspective view of the vehicular camera 100 according to the embodiment A. FIG. 2 is an exploded perspective view of the vehicular camera 100 according to the embodiment A. FIG. 3 is a top view of the vehicular camera 100 according to the embodiment A.

The vehicular camera 100 is an imaging device that is installed at front and rear ends, left and right side surfaces, and the like of a vehicle body of a vehicle, and images the inside and outside of the vehicle body of the vehicle. In recent years, development of the vehicular camera 100 has become active in response to demands for improvement in safety of the vehicle, introduction of an automated driving function, and the like.

The vehicular camera 100 according to the present embodiment includes at least one lens 32, a lens barrel portion 30, a welding ring 20, a circuit board 40 (see FIG. 2), an imaging element 50 (see FIG. 2), and a housing portion 60.

The at least one lens 32 is disposed along an optical axis extending in a direction perpendicular to the paper surface of FIG. 3. In the lens barrel portion 30, at least a lens barrel main body portion 31 has a first tubular shape, and accommodates the at least one lens 32 inside the lens barrel main body portion 31. When a plurality of lenses are provided in the lens barrel portion 30, the lenses are arranged in a state where optical axes thereof coincide with one another, and constitute a lens group used to image the inside and outside of the vehicle body of the vehicle.

The lens barrel portion 30 further includes a second flange portion 34 that protrudes in a direction away from the optical axis on an outer periphery of the lens barrel main body portion 31 and is made of a third resin. As the third resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of resin or a plurality of types of resins may be used as the third resin. In addition, a main resin may contain an absorbent that absorbs laser light, a coloring material, or both.

The third resin has a third light transmittance smaller than a first light transmittance of a first resin forming the welding ring 20 to be described later with respect to light having a predetermined wavelength. The second flange portion 34 may be molded integrally with the lens barrel main body portion 31, and in this case, the lens barrel main body portion 31 is also made of the third resin.

The third light transmittance of the third resin may be, for example, 0% or more and 5% or less with respect to light in a wavelength region of 350 nm to 1200 nm. In particular, the third light transmittance of the third resin is, for example, 0% or more and 5% or less with respect to light of 800 nm to 1200 nm which is the wavelength region of the laser light transmitted by the first resin.

The welding ring 20 having a planar shape protrudes in a direction away from the optical axis on an outer periphery of the lens barrel portion 30, and forms a flange portion that apparently protrudes from the lens barrel portion 30. The welding ring 20 forms the flange portion, and is also referred to as a first flange portion with respect to the second flange portion 34 of the lens barrel portion 30. In the embodiment A, the welding ring 20 is constituted by a ring-shaped member that is a flat plate having a rectangular annular shape in a plan view, and is fixed to the lens barrel portion 30 and the housing portion 60. An inner peripheral surface of the welding ring 20 faces an outer peripheral surface of the lens barrel portion 30. An inner diameter of the welding ring 20 has a length that allows insertion of the lens barrel portion 30.

The welding ring 20 has a third surface 23 facing the outside of the vehicular camera 100, and a fourth surface 24 (see FIG. 4) facing a housing portion 60 side opposite to the third surface 23. Further, the welding ring 20 includes at least three protrusions 22 disposed on the third surface 23, and in the embodiment A, four protrusions 22 (22a, 22b, 22c, and 22d). The protrusions 22 protrude in a direction away from the fourth surface 24 along an optical axis direction of the lens 32 (see FIG. 4). The role of the protrusions 22 will be described later.

The welding ring 20 is made of the first resin having the first light transmittance with respect to the light having the predetermined wavelength. For example, the first resin includes a polyester resin, a polyolefin resin, a polyamide resin, a vinyl chloride resin, and a fluorine resin. As the polyester resin, polybutylene terephthalate (PBT), polyethylene terephthalate (PET), or the like can be used. As the polyolefin resin, polyethylene, polypropylene, or the like can be used. One type of first resin or a plurality of types of first resins may be used. In addition, in a case of using laser welding to be described later, a coloring material, a filler, or both may be contained in a main light transmitting resin as long as a transmission performance of a certain level or more can be achieved.

The first light transmittance of the first resin is, for example, 20% or more with respect to light in a wavelength region of 800 nm to 1200 nm which is a wavelength of laser light used for laser welding. In addition, the first light transmittance of the first resin is, for example, 0% or more and 5% or less with respect to light of 350 nm to 800 nm which is a wavelength region of visible light.

The welding ring 20 has a flat rectangular annular shape in the embodiment A, but the shape is not limited thereto, and a welded portion may have a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The circuit board 40 is disposed in an internal space of the housing portion 60, and includes a first surface 41 facing the lens barrel portion 30 and a second surface 42 (see FIG. 4) opposite to the first surface 41. The imaging element 50 is disposed on the first surface 41 of the circuit board 40 and on the optical axis of the lens 32, and images light passing through the lens 32.

The housing portion 60 is a member which has an internal space and at least partially has a second tubular shape, and the housing portion 60 includes a large-diameter tubular portion 61 and a small-diameter tubular portion 62. When seen from a cross section perpendicular to the optical axis of the lens 32, the large-diameter tubular portion 61 has a larger cross-sectional area than the small-diameter tubular portion 62, and has a rectangular cross section. The large-diameter tubular portion 61 accommodates at least the circuit board 40 and the imaging element 50 described above. The small-diameter tubular portion 62 mainly accommodates a connector (not shown) that secures electrical connection with the outside of the vehicular camera 100. The large-diameter tubular portion 61 and the small-diameter tubular portion 62 may be integrally formed, and the large-diameter tubular portion 61 and the small-diameter tubular portion 62 prepared individually in advance may be bonded by a method such as welding or screwing. In the embodiment A, the housing portion 60 has a rectangular tubular shape, but the shape is not limited thereto, and may be a polygonal tubular shape other than the rectangular tubular shape, a circular or elliptical tubular shape, or another tubular shape.

In the housing portion 60, at least an end surface 64 having the second tubular shape, that is, the end surface 64 of the large-diameter tubular portion 61 is made of a second resin having a second light transmittance smaller than the first light transmittance of the welding ring 20 with respect to the light having the predetermined wavelength. Most of the housing portion 60 may be made of a metal, and only the end surface 64 may be made of a resin. The end surface 64 is fixed to the fourth surface 24 of the welding ring 20 (see FIG. 4).

As the second resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of resin or a plurality of types of resins may be used. In addition, in a case of using laser welding to be described later, a main light absorbing resin may contain an absorbent that absorbs laser light, a coloring material, or both.

The second light transmittance of the second resin is, for example, 0% or more and 5% or less with respect to light in a wavelength region of 350 nm to 1200 nm.

Figure 4:
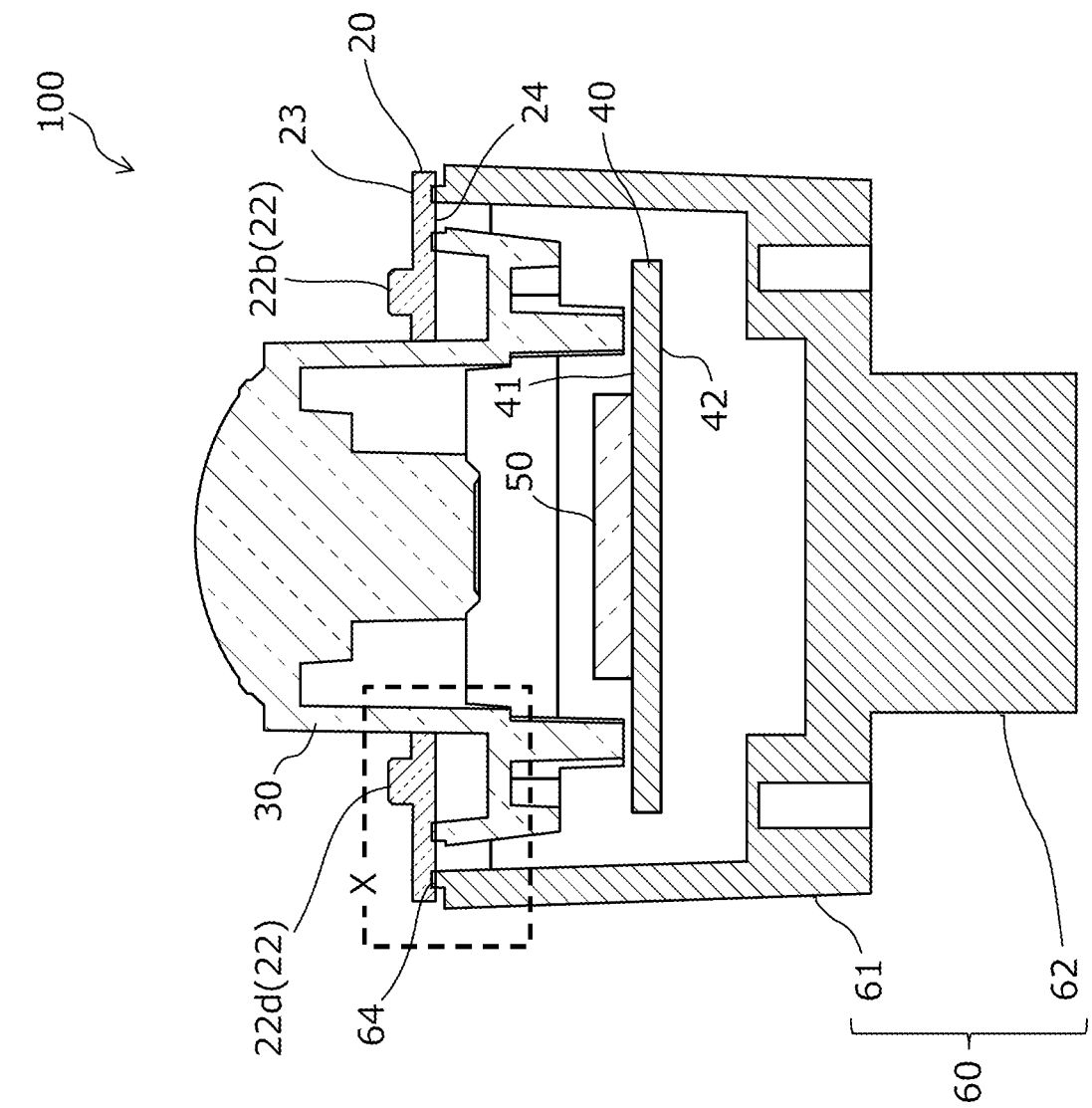
FIG. 4 is a cross-sectional view taken along a line A-A of FIG. 3.
Figure 5:
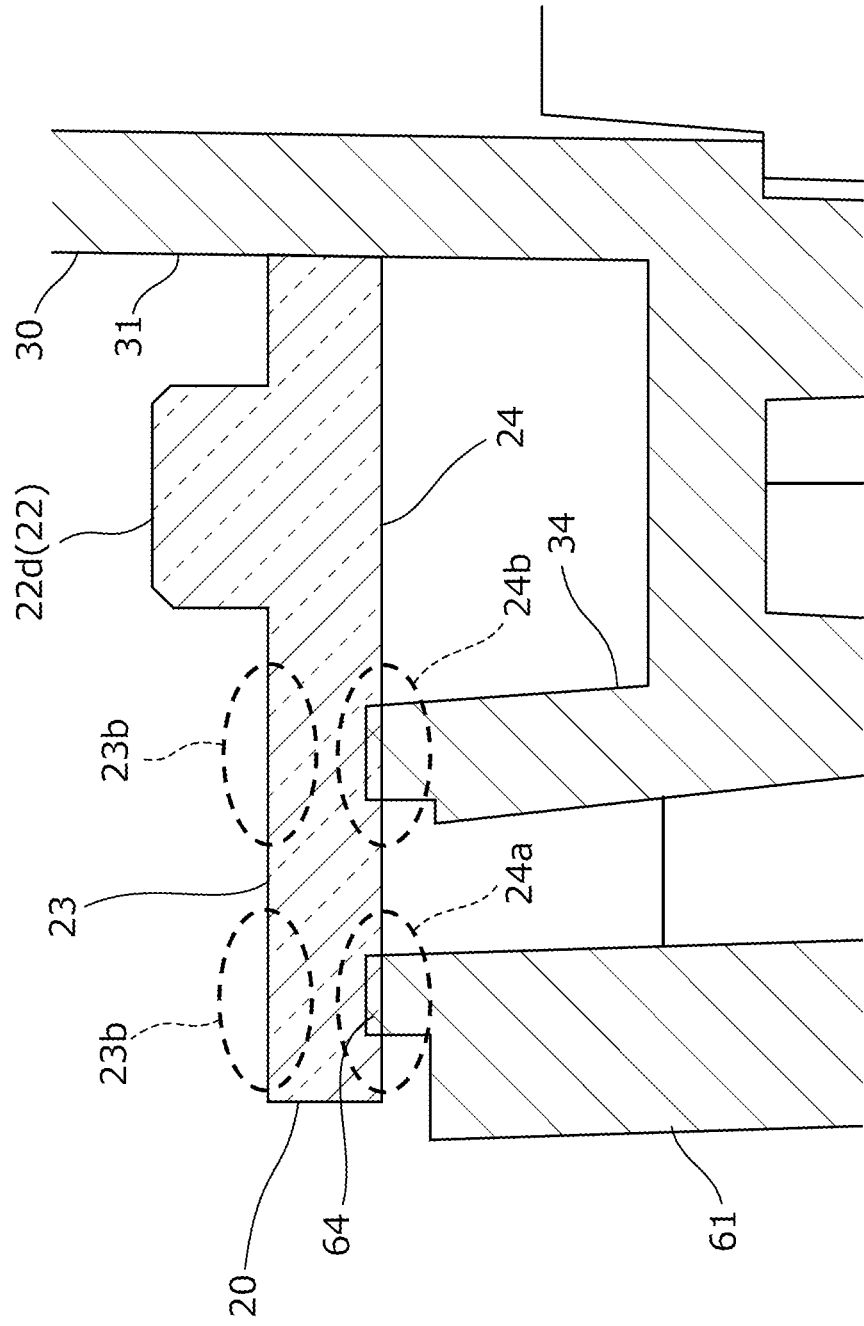
FIG. 5 is an enlarged view of a portion X in FIG. 4.

FIG. 4 is a cross-sectional view taken along a line A-A of FIG. 3. FIG. 5 is an enlarged view of a portion X in FIG. 4. The welding ring 20 is fixed to the lens barrel portion 30 and the housing portion 60. The fixing can be implemented by, for example, welding based on laser welding.

In a general laser welding method, when laser light is irradiated to a light transmitting resin in a state where a pressure is applied to the resin, the laser light is transmitted without being absorbed by the light transmitting resin and is absorbed by a surface of a light absorbing resin. The energy of the absorbed laser light is converted into heat, and the surface of the light absorbing resin is heated. Further, a surface of the light transmitting resin in contact with the surface of the light absorbing resin is also heated due to heat conduction. Accordingly, the resin is melted at a boundary surface between the light absorbing resin and the light transmitting resin. When the laser light irradiation is stopped, the molten resin is solidified and both resins are welded.

In the embodiment A, first, the fourth surface 24 of the welding ring 20 constituting the first flange portion is irradiated with the laser light in a state of being pressed against the second flange portion 34 of the lens barrel portion 30, and the fourth surface 24 of the welding ring 20 and the second flange portion 34 are welded. Thereafter, the fourth surface 24 of the welding ring 20 welded to the second flange portion 34 is irradiated with the laser light in a state of being pressed against the end surface 64 of the housing portion 60, and the fourth surface 24 of the welding ring 20 welded to the second flange portion 34 and the end surface 64 are welded.

It is desirable to fix (including laser welding) the end surface 64 of the housing portion 60 to the welding ring 20 over the entire periphery of the tubular shape of the housing portion 60. Accordingly, the welding ring 20 and the housing portion 60 can be firmly fixed to each other.

The lens barrel portion 30 and the welding ring 20 may be a single member bonded in advance before being attached to the housing portion 60. The bonding may be implemented by the laser welding described above. By using such a member, a process of fixing the lens barrel portion 30 and the welding ring 20 can be omitted, and therefore an assembly process of the vehicular camera 100 can be simplified.

A form of the welding will be described in detail with reference to FIG. 5.

The end surface 64 of the housing portion 60 is fixed in a fixing region 24a of the fourth surface 24 of the welding ring 20 constituting the flange portion (the first flange portion) by laser welding. Accordingly, the welding ring 20 can be firmly fixed to the housing portion 60.

Then, in the third surface 23 of the welding ring 20, the at least three protrusions 22, in the embodiment A, the four protrusions 22 (the protrusion 22*d* in FIG. 5) of the welding ring 20 are disposed closer to the lens barrel portion 30 than a fixing-corresponding region 23*a* of the third surface 23 corresponding to the fixing region 24*a* of the fourth surface 24. The fixing region 24*a* and the fixing-corresponding region 23*a* exist at corresponding positions in a thickness direction of the welding ring 20, and exist substantially along the optical axis direction.

Further, the fixing region 24*a* of the fourth surface 24 of the welding ring 20 is defined as the first fixing region 24*a*, and the fixing-corresponding region 23*a* of the third surface 23 of the welding ring 20 is defined as the first fixing-corresponding region 23*a*. Thus, the fourth surface 24 of the welding ring 20 is fixed to the end surface 64 of the second tubular shape of the housing portion 60 in the first fixing region 24*a*. Further, the fourth surface 24 of the welding ring 20 is fixed to the second flange portion 34 in a second fixing region 24*b*. The second fixing region 24*b* is located closer to the lens barrel portion 30 than the first fixing region 24*a*.

Then, in the third surface 23 of the welding ring 20, the at least three protrusions 22, in the embodiment A, the four protrusions 22 (the protrusion 22*d* in FIG. 5) of the welding ring 20 are disposed closer to the lens barrel portion 30 than a second fixing-corresponding region 23*b* of the third surface 23 corresponding to the second fixing region 24*b* of the fourth surface 24. The second fixing region 24*b* and the second fixing-corresponding region 23*b* exist at corresponding positions in the thickness direction of the welding ring 20, and exist substantially along the optical axis direction.

Accordingly, the second flange portion 34 of the lens barrel portion 30 and the end surface 64 of the housing portion 60 are fixed to the welding ring 20, and therefore the lens barrel portion 30, the welding ring 20, and the housing portion 60 can be assembled integrally.

Needless to say, the second fixing region 24*b* of the fourth surface 24 of the welding ring 20 and the second flange portion 34 are fixed by laser welding. The welding ring 20 and the second flange portion 34 can be firmly fixed to each other.

Further, the second fixing region 24*b* is located closer to the lens barrel portion 30 than the first fixing region 24*a*. Therefore, the lens barrel portion 30 and the welding ring 20 can be fixed inside the housing portion 60.

Figure 6:
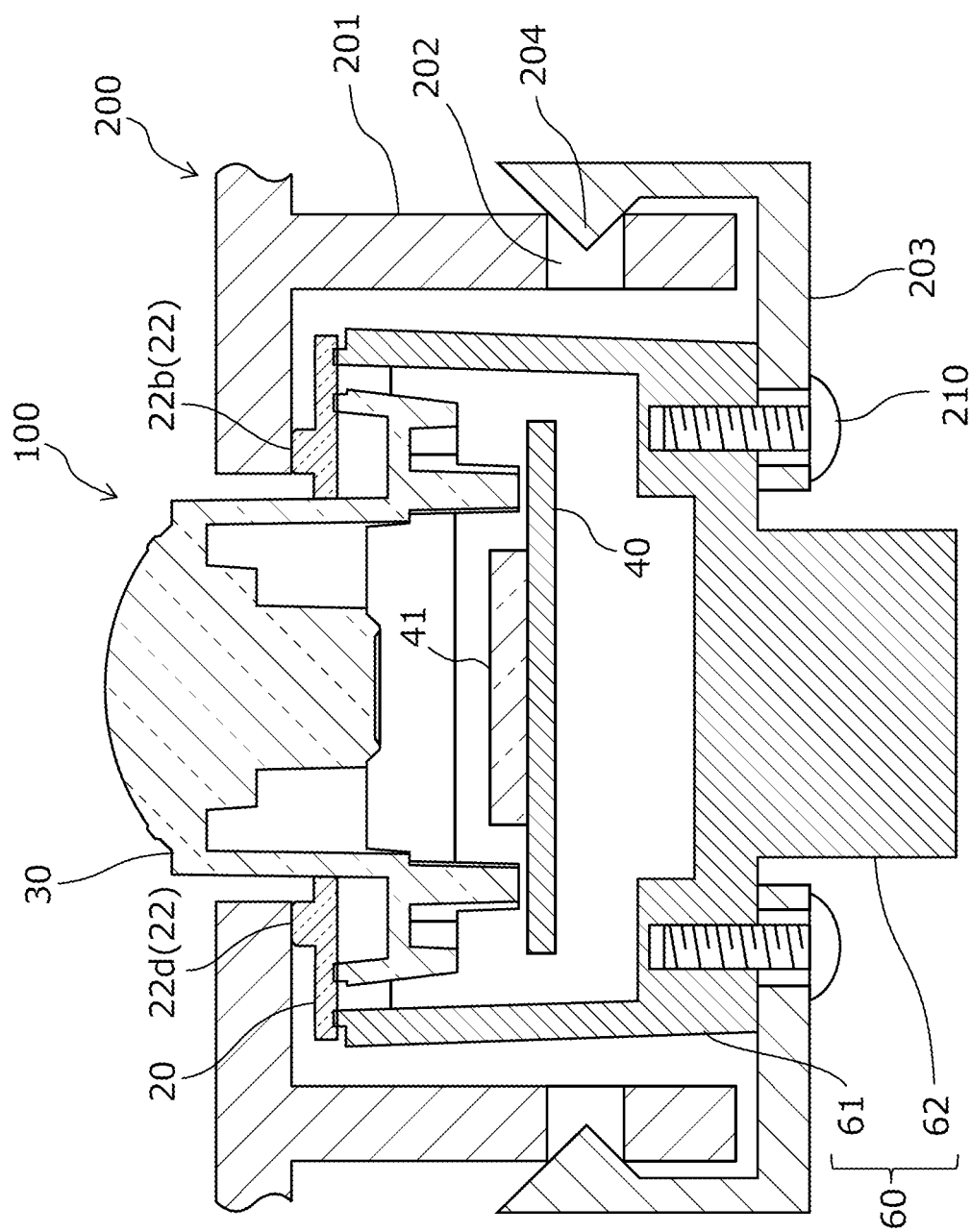
FIG. 6 is a cross-sectional view in a state where the vehicular camera is attached to a vehicle body.

FIG. 6 is a cross-sectional view in a state where the vehicular camera 100 according to the embodiment A is attached to a vehicle body 200 as a part of the vehicle. A bracket 203 constituted by an elastic member is fixed to the vehicular camera 100 by using a screw 210. By engaging an engaging protrusion 204 of the bracket 203 with an engaging hole 202 of an attaching portion 201 protruding from the vehicle body 200, the vehicular camera 100 is attached to the vehicle body 200.

During the attaching of the vehicular camera 100, the at least three protrusions 22, in the embodiment A, the four protrusions 22 (22*a*, 22*b*, 22*c*, and 22*d*) are in contact with the vehicle body 200, and a positional relation with the vehicle is defined. Therefore, it is possible to eliminate an influence caused by a dimensional error between the vehicular camera 100 and the vehicle body 200 and to improve positioning accuracy of the vehicular camera 100, and it is also possible to restrain blurring of a captured image (a captured video) obtained by the vehicular camera 100.

In addition, by changing a height dimension of each protrusion 22, it is possible to freely adjust a mounting inclination of the vehicular camera 100 with respect to the vehicle.

Further, as described with reference to FIG. 6, the protrusions 22 are disposed to avoid the fixing region 24*a* and the fixing-corresponding region 23*a*, and therefore damage to the protrusions 22 can be restrained when the welding ring 20 is fixed to the lens barrel portion 30 and the housing portion 60.

In addition, in the third surface 23 of the welding ring 20, the protrusions 22 are disposed closer to the lens barrel portion 30 than the second fixing-corresponding region 23*b* of the third surface 23 corresponding to the second fixing region 24*b* of the fourth surface 24. That is, the protrusions 22 are disposed to avoid the first fixing region 24*a*, the first fixing-corresponding region 23*a*, the second fixing region 24*b* and the second fixing-corresponding region 23*b*, and therefore the damage to the protrusions 22 can be restrained when the welding ring 20 is fixed to the lens barrel portion 30 and the housing portion 60.

Further, each of the at least three protrusions 22 has a predetermined height in the optical axis direction. This height is a height along the optical axis direction from the third surface 23 of the welding ring 20. Accordingly, the positioning accuracy of the vehicular camera 100 can be improved. Further, a shape of the protrusions 22 is a cylindrical shape, but the shape of the protrusions 22 is not limited, and may be a hemispherical shape or the like.

In the embodiment A, a first cross section of the first tubular shape of the lens barrel portion 30, which is orthogonal to the optical axis direction, has a circular shape, and a second cross section of the second tubular shape of the housing portion 60, which is orthogonal to the optical axis direction, has a quadrangular shape. Corresponding to this, the at least three protrusions 22 are disposed corresponding to corners of the quadrangular shape. Accordingly, the vehicular camera 100 can be stably positioned with respect to the vehicle body 200.

Further, in the embodiment A, the quadrangular shape of the second cross section of the housing portion 60 has, at at least one corner, a notch 66 formed by cutting off the corner including a vertex. Here, the protrusion 22*a*, which is one of the at least three protrusions 22, is disposed corresponding to the at least one corner where the notch 66 is formed. The notch 66 can be formed, for example, when the housing portion 60 is molded.

Further, the protrusion 22*a* is disposed closer to the lens barrel portion 30 than at least one of the three protrusions 22*b*, 22*c*, and 22*d* disposed corresponding to the corners where no notch 66 is formed. In particular, in the embodiment A, the protrusion 22*a* is disposed closer to the lens barrel portion 30 than all of the three protrusions 22*b*, 22*c*, and 22*d*.

Accordingly, it is possible to attach the vehicular camera 100 to the vehicle body 200 while maintaining the arrangement of the protrusions 22 and securing a correct posture of the vehicular camera 100, in particular, a position in a circumferential direction on a plane perpendicular to the optical axis by the notch 66. Further, the welding ring 20 also includes a notch 26, and the lens barrel portion 30 also includes a notch 36 at a corner of the second flange portion 34. The notch 26 and the notch 36 are disposed corresponding to the notch 66.

As described above, the at least three protrusions 22 include the four protrusions 22*a*, 22*b*, 22*c*, and 22*d*. Accordingly, the vehicular camera 100 can be more stably positioned with respect to the vehicle body 200. Needless to say, the number of the protrusions 22 may be at least three, and may be five or more.

As illustrated in FIG. 6, the at least three protrusions 22 are configured to be in contact with the vehicle body 200. Accordingly, the at least three protrusions 22 are in contact with the vehicle body 200, and the positional relation with the vehicle is defined, and therefore it is possible to eliminate the influence caused by the dimensional error between the vehicular camera 100 and the vehicle body 200, and to improve the positioning accuracy of the vehicular camera 100.

In addition, by changing a height dimension of each protrusion 22, it is possible to freely adjust a mounting inclination of the vehicular camera 100 with respect to the vehicle.

Embodiment B1

Figure 7A:
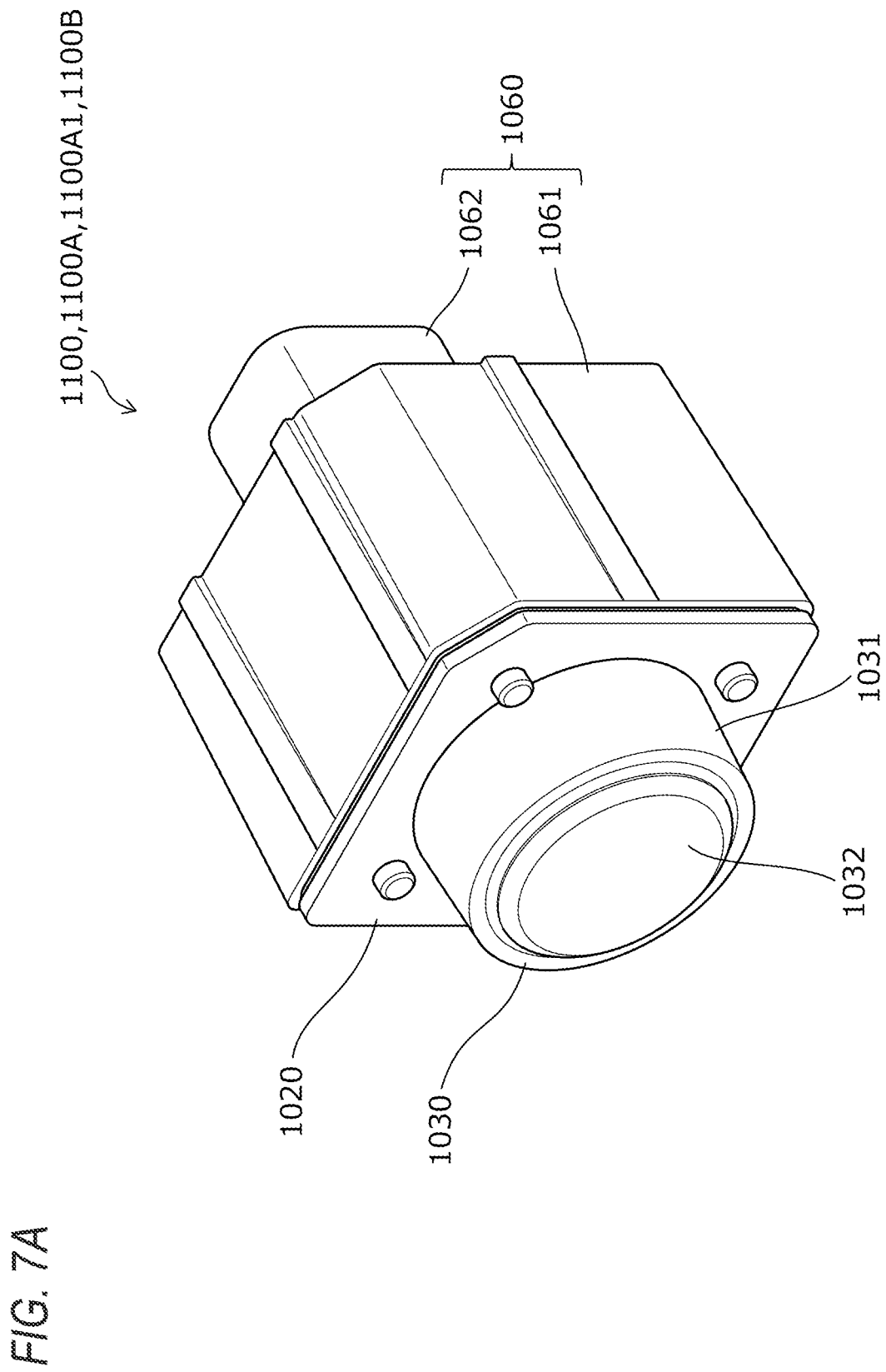
FIG. 7A is a top perspective view of a vehicular camera according to embodiments B1 and B2.
Figure 7B:
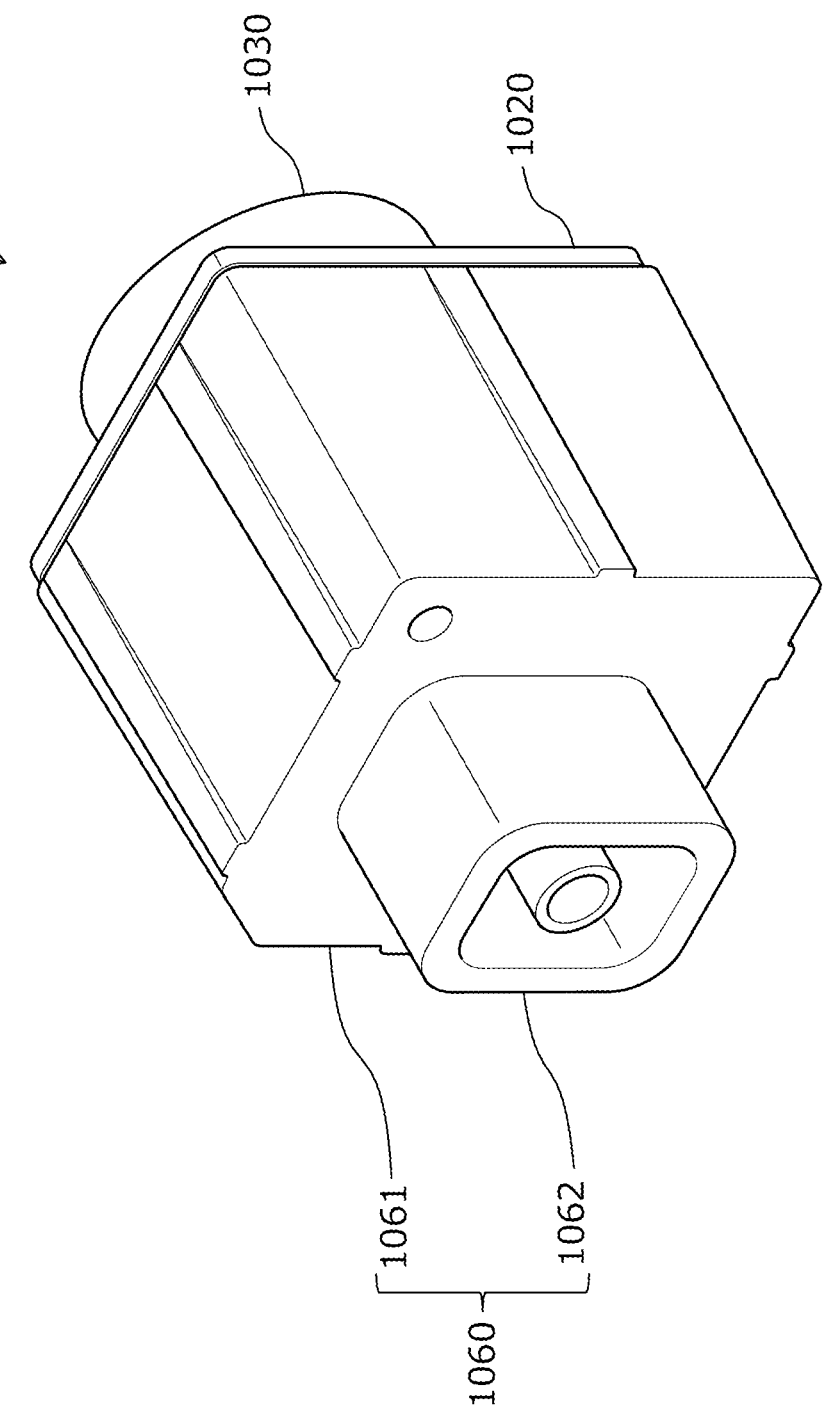
FIG. 7B is a bottom perspective view of the vehicular camera according to the embodiments B1 and B2.
Figure 8:
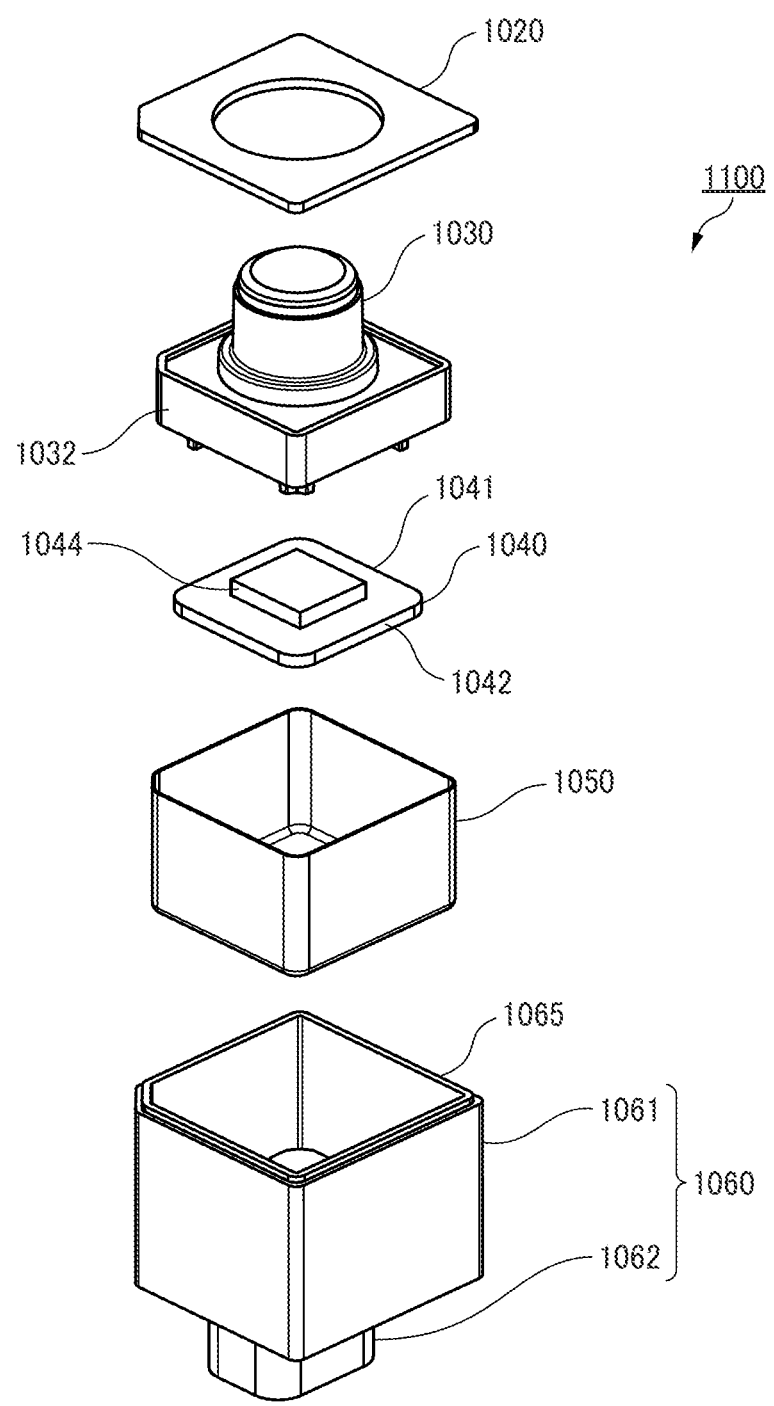
FIG. 8 is an exploded perspective view of the vehicular camera according to the embodiment B1.
Figure 9:
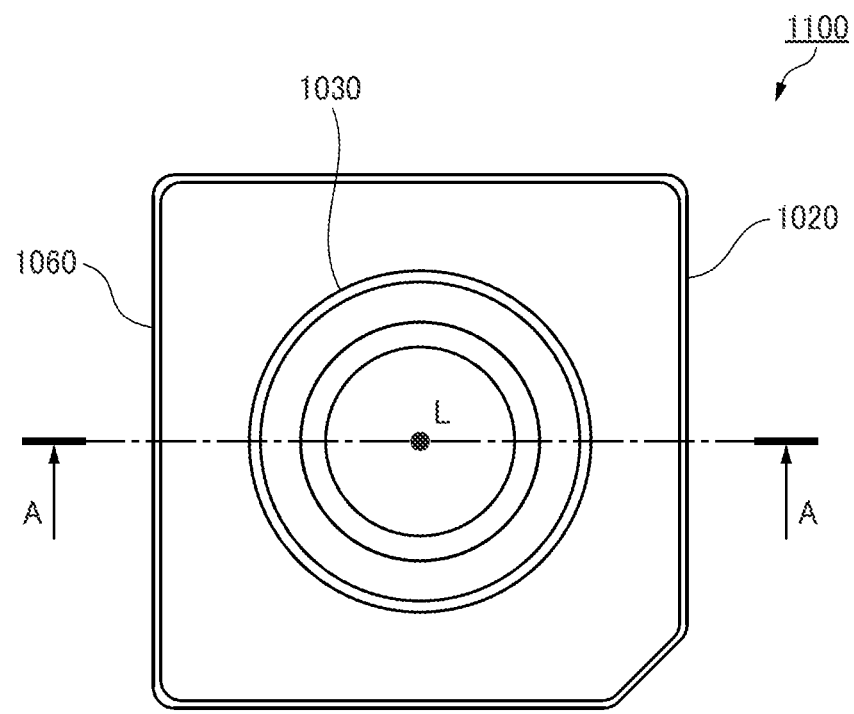
FIG. 9 is a top view of the vehicular camera according to the embodiments B1 and B2.
Figure 10:
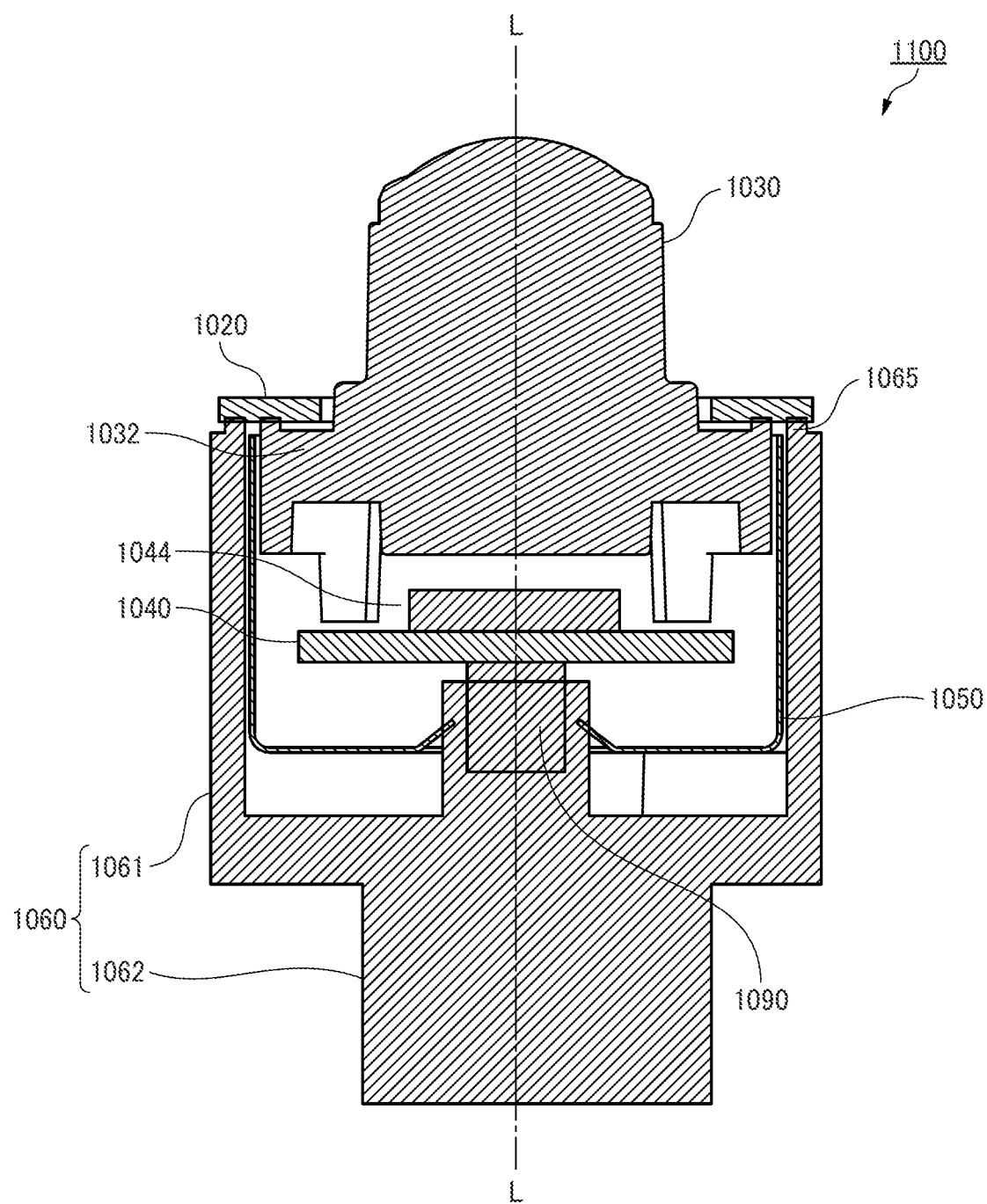
FIG. 10 is a cross-sectional view of the vehicular camera according to the embodiment B1 taken along the line A-A of FIG. 9.

FIG. 7A is a top perspective view of a vehicular camera 1100 according to embodiments B1 and B2. FIG. 7B is a bottom perspective view of the vehicular camera 1100 according to the embodiments B1 and B2. FIG. 8 is an exploded perspective view of the vehicular camera 1100 according to the embodiment B1. FIG. 9 is a top view of the vehicular camera 1100 according to the embodiments B1 and B2. FIG. 10 is a cross-sectional view of the vehicular camera 1100 according to the embodiment B1 taken along a line A-A of FIG. 9. FIGS. 7A, 7B, and 9 are common in the entire embodiments B1 and B2 to be described later.

The vehicular camera 1100 is an imaging device that is installed at the front and rear ends, the left and right side surfaces, and the like of the vehicle body of the vehicle, and images the inside and outside of the vehicle body of the vehicle. In recent years, development of the vehicular camera 1100 has become active in response to demands for improvement in safety of the vehicle, introduction of an automated driving function, and the like.

The vehicular camera 1100 according to the embodiment B1 includes a lens barrel portion 1030, a circuit board 1040, an imaging element 1044, a housing portion 1060, and a shield 1050. As illustrated in FIG. 8, the vehicular camera 1100 according to the embodiment B1 may further include a ring member 1020.

The lens barrel portion 1030 has a tubular shape and accommodates at least one lens therein. The lens is disposed along an optical axis L (see FIGS. 9 and 10). When a plurality of lenses are provided in the lens barrel portion 1030, the lenses are arranged in a state where the optical axes L thereof coincide with one another, and constitute a lens group used to image the inside and outside of the vehicle body of the vehicle.

The lens barrel portion 1030 has a flange portion 1032. The flange portion 1032 is located in a vicinity of an opening of an internal space of the housing portion 1060 to be described later. At least a part of the flange portion 1032 is bonded to the housing portion 1060 through the ring member 1020 to be described later.

The lens barrel portion 1030 is made of, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin. One type of resin or a plurality of types of resins may be used. In addition, a main resin may contain an absorbent that absorbs laser light, a coloring material, or both.

The circuit board 1040 is disposed in the internal space of the housing portion 1060 and has a first surface 1041 facing the lens barrel portion 1030 and a second surface 1042 opposite to the first surface 1041. The imaging element 1044 is disposed on the first surface 1041 of the circuit board 1040 and on the optical axis L of the lens housed in the lens barrel portion 1030. The imaging element 1044 receives the light passing through the lens and performs photoelectric conversion based on the received light to capture an image of a subject.

The ring member 1020 is constituted by a flat plate having a rectangular annular shape in a plan view, and is fixed to the lens barrel portion 1030 and the housing portion 1060. The ring member 1020 is disposed to protrude in a direction away from the optical axis L of the lens over the entire periphery of the lens barrel portion 1030 (the entire periphery around the optical axis L of the lens).

The ring member 1020 is made of, for example, a polyester resin, a polyolefin resin, a polyamide resin, a vinyl chloride resin, or a fluorine resin. As the polyester resin, polybutylene terephthalate (PBT), polyethylene terephthalate (PET), or the like can be used. As the polyolefin resin, for example, polyethylene, polypropylene, or the like can be used. One type of resin or a plurality of types of resins may be used. In addition, in a case of using laser welding to be described later, a coloring material, a filler, or both may be contained in a main light transmitting resin as long as a transmission performance of a certain level or more can be achieved.

The ring member 1020 has a flat rectangular annular shape in the embodiment B1, but the shape is not limited thereto, and a welded portion may have a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The housing portion 1060 is a member which has an internal space and at least partially has a tubular shape, and the housing portion 1060 includes a large-diameter tubular portion 1061 and a small-diameter tubular portion 1062. When seen from a plane intersecting with the optical axis L of the lens (for example, a plane orthogonal to the optical axis L of the lens), the large-diameter tubular portion 1061 has a larger cross-sectional area than the small-diameter tubular portion 1062, and has a rectangular cross-section. The large-diameter tubular portion 1061 accommodates at least the circuit board 1040. The small-diameter tubular portion 1062 mainly accommodates a connector (to be described later) that secures electrical connection with the outside of the vehicular camera 1100 (for example, an electric control unit (ECU) as a control engine of the vehicle). The large-diameter tubular portion 1061 and the small-diameter tubular portion 1062 may be integrally formed, and the large-diameter tubular portion 1061 and the small-diameter tubular portion 1062 prepared individually in advance may be bonded by a method such as welding or screwing. In the embodiment B1, the housing portion 1060 has a rectangular tubular shape, but the shape is not limited thereto, and may be a polygonal tubular shape other than the rectangular tubular shape, a circular or elliptical tubular shape, or another tubular shape.

The housing portion 1060 is made of, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin. One type of resin or a plurality of types of resins may be used. In addition, in a case of using laser welding to be described later, a main light absorbing resin may contain an absorbent that absorbs laser light, a coloring material, or both.

As illustrated in FIG. 10, the ring member 1020 is fixed to the flange portion 1032 of the lens barrel portion 1030 and an end surface 1065 of the housing portion 1060. The fixing can be implemented by, for example, laser welding. Specifically, in the embodiment B1, the end surface 1065 of a tubular shape of the housing portion 1060 and the ring member 1020 are fixed to each other by laser welding using a laser beam passing through the ring member 1020. By the fixing using laser welding, the ring member 1020 and the housing portion 1060 can be easily and reliably fixed to each other. Accordingly, the lens barrel portion 1030 is fixed to the housing portion 1060 via the ring member 1020.

The shield 1050 is a metal member accommodated in the housing portion 1060. The shield 1050 is a member having an open at an upper surface and has a rectangular tubular shape, and is accommodated in a state of being in close contact with an inner surface of the housing portion 1060. The shield 1050 is a member for shielding a component accommodated in the housing portion 1060, in particular, the circuit board 1040 from external electromagnetic waves.

In addition, a connector 1090 for supplying power from an external power supply is inserted from an end of the housing portion 1060 and is connected to the circuit board 1040. The connector 1090 is, for example, a coaxial connector, and can supply high-frequency power.

Embodiment B2

Figure 11:
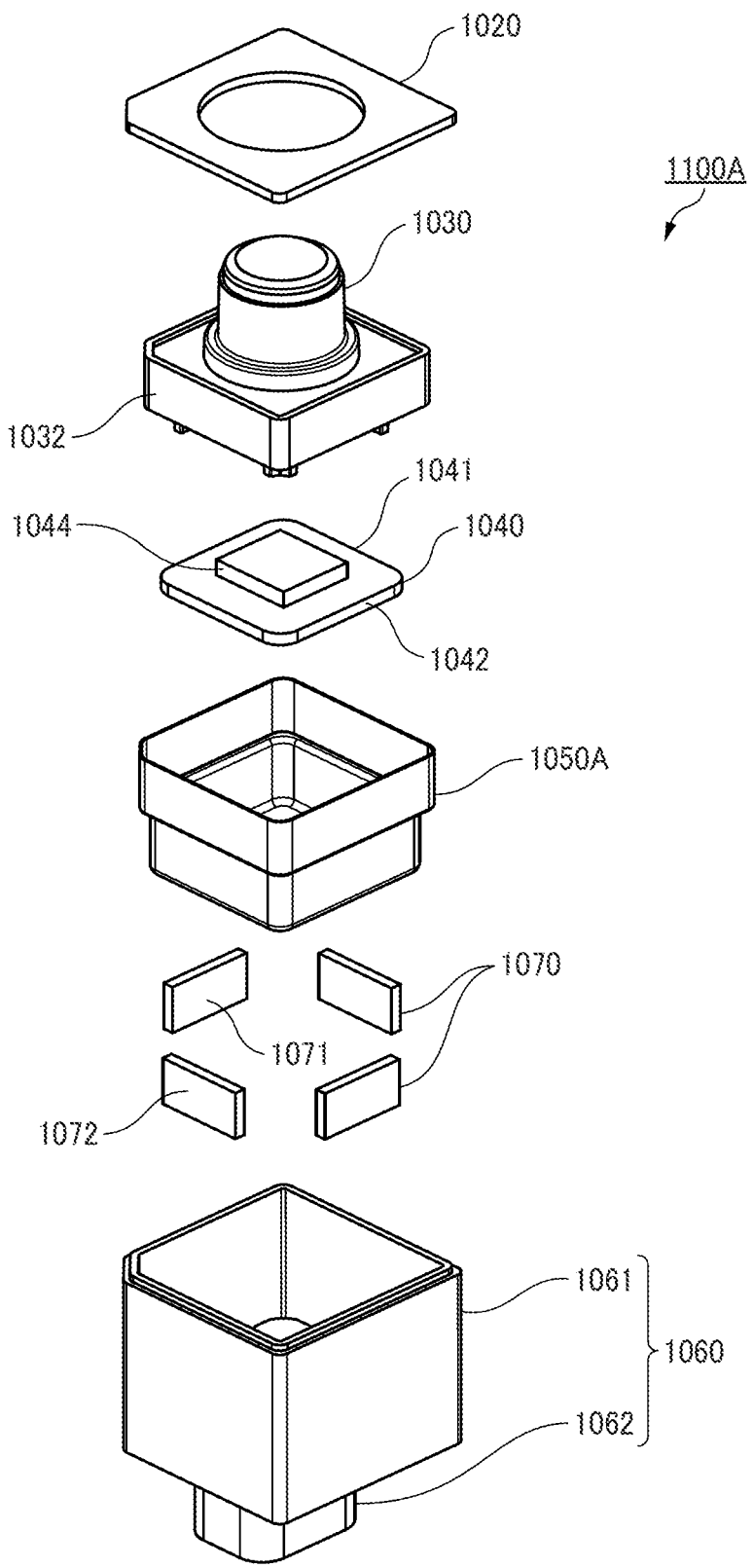
FIG. 11 is an exploded perspective view of the vehicular camera according to the embodiment B2.
Figure 12A:
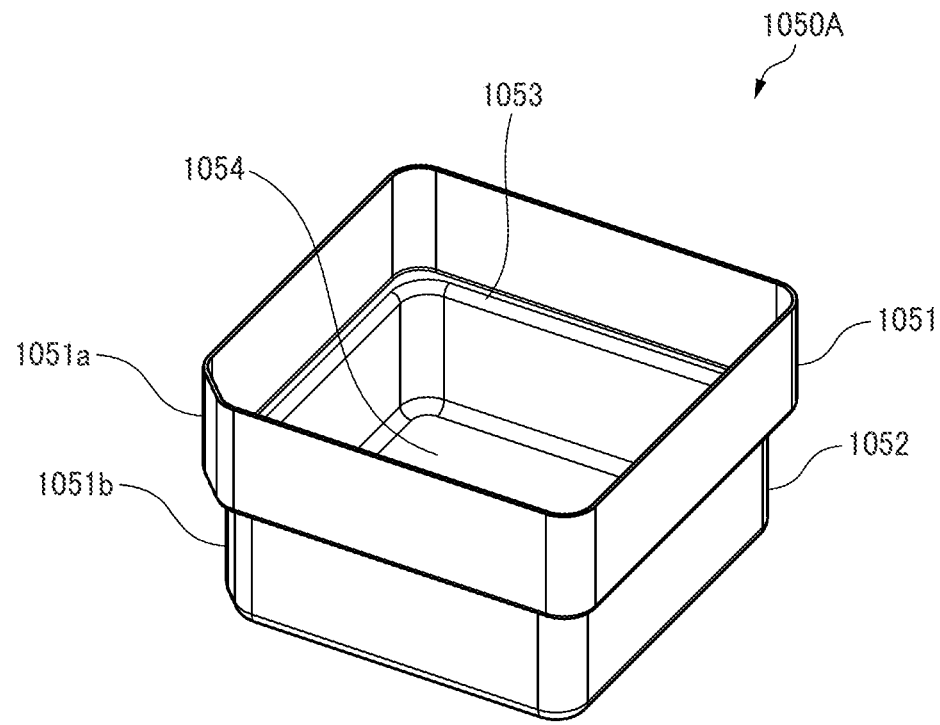
FIG. 12A is a top perspective view of a shield of the vehicular camera according to the embodiment B2.
Figure 12B:
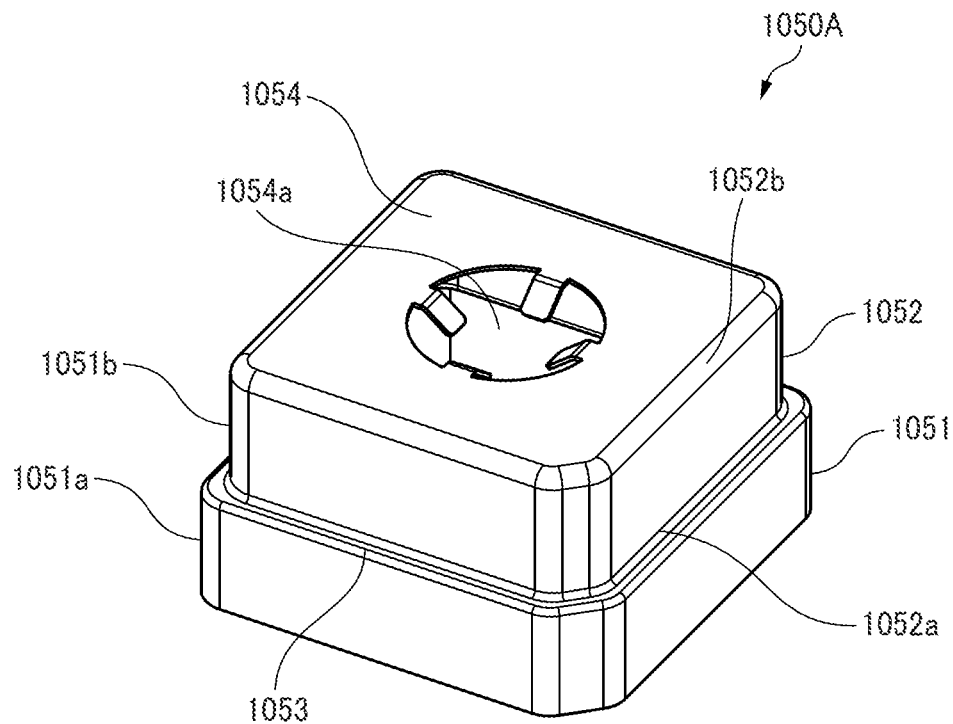
FIG. 12B is a bottom perspective view of the shield of the vehicular camera according to the embodiment B2.
Figure 13:
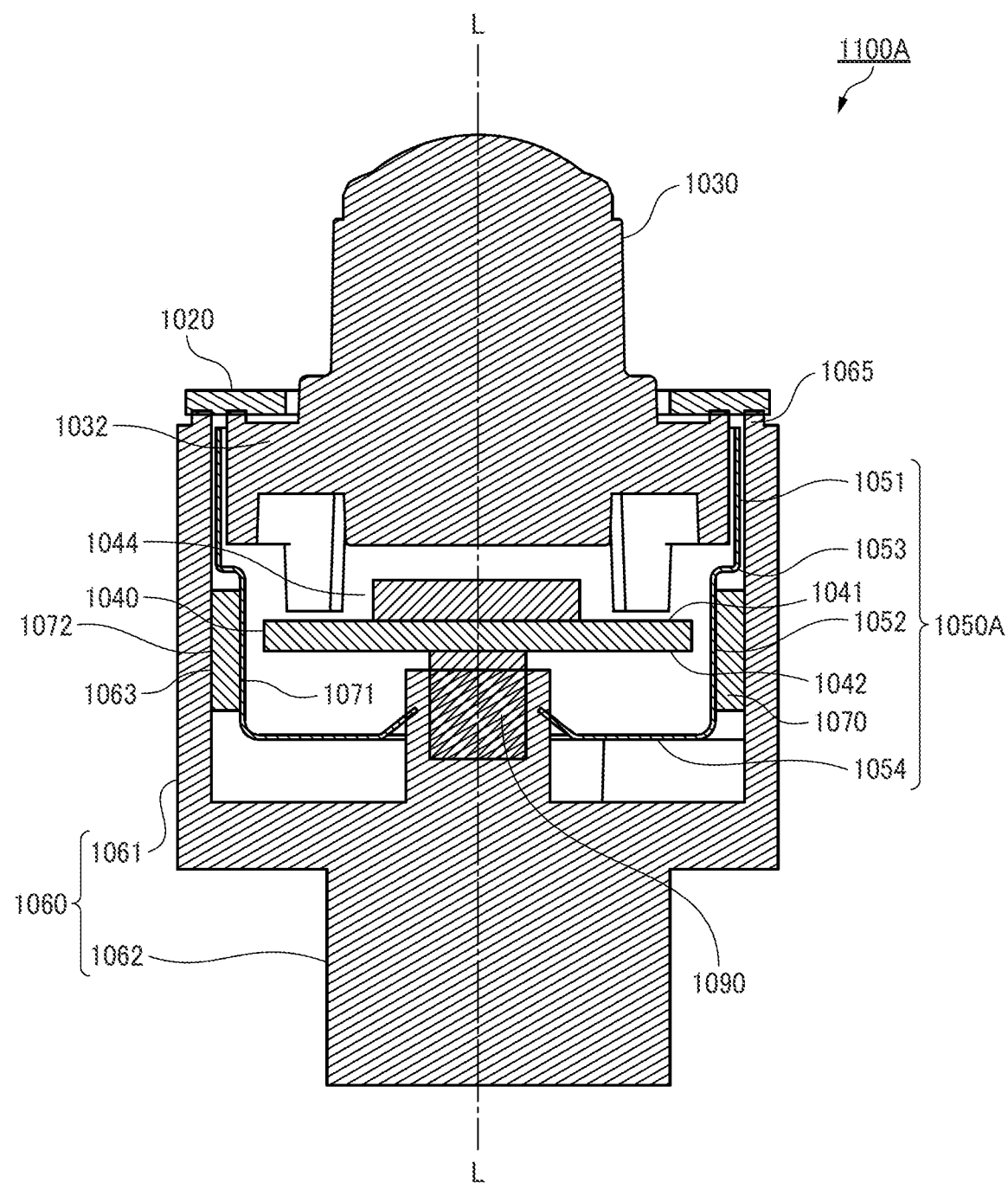
FIG. 13 is a cross-sectional view of the vehicular camera according to the embodiment B2 taken along the line A-A of FIG. 9.

FIG. 11 is an exploded perspective view of a vehicular camera 1100A according to an embodiment B2. FIG. 12A is a top perspective view of a shield of the vehicular camera 1100A according to the embodiment B2. FIG. 12B is a bottom perspective view of the shield of the vehicular camera 1100A according to the embodiment B2. FIG. 13 is a cross-sectional view of the vehicular camera 1100A according to the embodiment B2 taken along the line A-A of FIG. 9.

In the description of the embodiment B2, the same components as those of the vehicular camera 1100 according to the embodiment B1 are denoted by the same reference numerals, the description thereof will be simplified or omitted, and different contents will be described.

As illustrated in FIG. 11, in the vehicular camera 1100A according to the embodiment B2, a shape of a shield 1050A is different from the shape of the shield 1050 according to the embodiment B1. The vehicular camera 1100A according to the embodiment B2 further includes a resin sheet 1070 as a first resin member.

As illustrated in FIGS. 12A and 12B, similar to the shield 1050 according to the embodiment B1, the shield 1050A of the vehicular camera 1100A according to the embodiment B2 is a member having an open at an upper surface and has a rectangular tubular shape, and includes a large-diameter portion 1051a and a small-diameter portion 1051b. The large-diameter portion 1051a has a larger diameter than the small-diameter portion 1051b in the direction of the plane intersecting with the optical axis L (for example, the plane orthogonal to the optical axis L). A side surface of the shield 1050A is provided to have a stepped shape having a step between the large-diameter portion 1051a and the small-diameter portion 1051b.

More specifically, the shield 1050A includes a first side surface portion 1051, a second side surface portion 1052, and a connection portion 1053. The first side surface portion 1051 constitutes a side surface of the large-diameter portion 1051a, is disposed to be adjacent to a side wall inner surface 1063 (see FIG. 13) of the housing portion 1060, and extends in a direction along the optical axis L. The direction along the optical axis L is, for example, a direction parallel to the optical axis L. The first side surface portion 1051 is adjacent to the side wall inner surface 1063 of the housing portion 1060, and may be in contact with the side wall inner surface 1063, and may be slightly away from the side wall inner surface 1063.

The second side surface portion 1052 constitutes a side surface of the small-diameter portion 1051b, is disposed closer to the optical axis L than the first side surface portion 1051, and extends in a direction along the optical axis L. The direction along the optical axis L is, for example, a direction parallel to the optical axis L. The connection portion 1053 connects the first side surface portion 1051 and the second side surface portion 1052 that are separated from each other in a direction intersecting with the optical axis L (in other words, in a radial direction). The shield 1050A further includes a bottom surface portion 1054 connected to the second side surface portion 1052. The direction intersecting with the optical axis L is, for example, a direction orthogonal to the optical axis L.

The resin sheet 1070 as the first resin member is disposed between the side wall inner surface 1063 of the housing portion 1060 and the second side surface portion 1052 of the shield 1050A (see FIG. 13). The resin sheet 1070 is a component formed in advance by injection molding, for example.

The resin sheet 1070 is disposed to be in contact with at least a part of each of the side wall inner surface 1063 and the second side surface portion 1052. A resin forming the first resin member is not particularly limited, and it is desirable to form the first resin member by using a material containing at least silicone in view of heat dissipation. The silicone has a heat dissipation function, and can efficiently dissipate heat inside the housing portion 1060.

During the assembling of the vehicular camera 1100A according to the embodiment B2, the resin sheet 1070 is disposed in a gap between the side wall inner surface 1063 and the second side surface portion 1052 when the shield 1050A is disposed inside the housing portion 1060. For example, the resin sheet 1070 may be disposed inside the housing portion 1060 in advance before the shield 1050A is accommodated inside the housing portion 1060. Further, the shield 1050A may be accommodated inside the housing portion 60 in a state where the resin sheet 1070 is attached to the second side surface portion 1052.

According to the present embodiment, the resin sheet 1070 as the first resin member is in contact with at least a part of each of the side wall inner surface 1063 of the housing portion 1060 and the second side surface portion 1052 of the shield 1050A, and therefore heat generated by an electronic component such as the circuit board 1040 can be efficiently dissipated. Therefore, the occurrence of failure in the vehicular camera 1100A can be restrained, and the function thereof can be maintained. In particular, the function of the imaging element can be maintained.

In addition, the first resin member having a heat dissipation effect is constituted by the plate-shaped resin sheet 1070, and the resin sheet 1070 is disposed between the side wall inner surface 1063 and the second side surface portion 1052 in a compressed state. That is, before the assembling of the vehicular camera 1100A, the thickness of the resin sheet 1070 is larger than the gap between the side wall inner surface 1063 and the second side surface portion 1052. Further, during the assembling, the resin sheet 1070 is compressed in a thickness direction and is disposed in the gap.

Accordingly, the resin sheet 1070 is in close contact with the side wall inner surface 1063 and the second side surface portion 1052, and therefore the heat generated by the electronic component such as the circuit board 1040 can be efficiently dissipated.

The number of the resin sheets 1070 may be one, and a plurality of resin sheets may be disposed. In particular, in the embodiment B2, as illustrated in FIG. 11, a plurality of the resin sheets 1070 are arranged to surround the periphery of the optical axis L. More specifically, four resin sheets 1070 corresponding to the rectangular second side surface portion 1052 are arranged to surround the periphery of the optical axis L and further the circuit board 1040.

Accordingly, the resin sheet 1070 can efficiently dissipate the heat generated by the electronic component such as the circuit board 1040 without any deviation.

The resin sheet 1070 has a plate shape, and has an inner surface 1071 facing the second side surface portion 1052 of the shield 1050 and an outer surface 1072 facing the side wall inner surface 1063 of the housing portion 1060. As illustrated in FIG. 13, the entire inner surface 1071 is in contact with the second side surface portion 1052, and the entire outer surface 1072 is in contact with the side wall inner surface 1063.

Accordingly, the two opposing surfaces of the resin sheet 1070 are in close contact with the side wall inner surface 1063 and the second side surface portion 1052 as a whole, and therefore the heat generated by the electronic component such as the circuit board 1040 can be efficiently dissipated.

Modification of Embodiment B2

Figure 14:
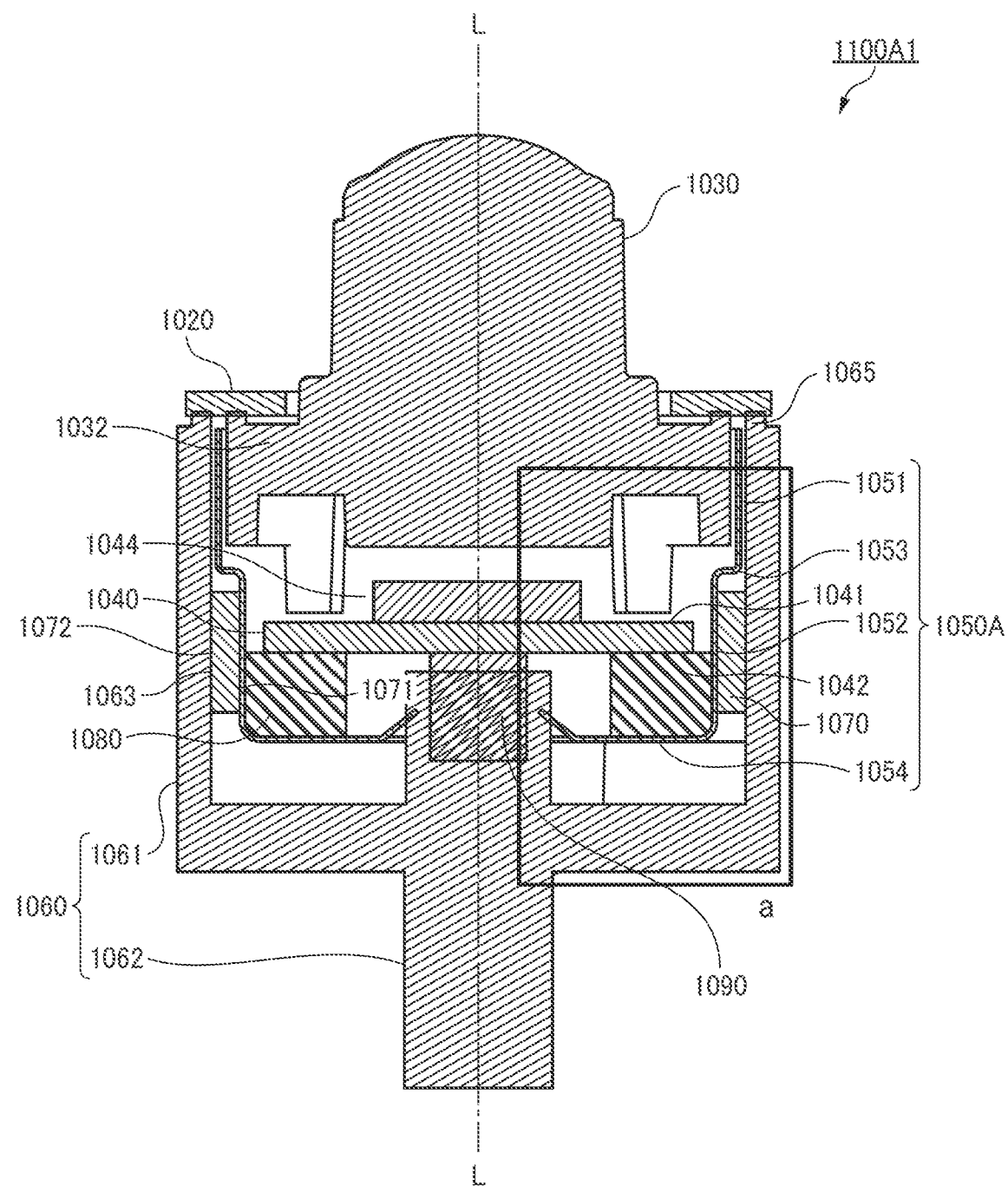
FIG. 14 is a cross-sectional view of a vehicular camera according to a modification of the embodiment B2 taken along the line A-A of FIG. 9.
Figure 15:
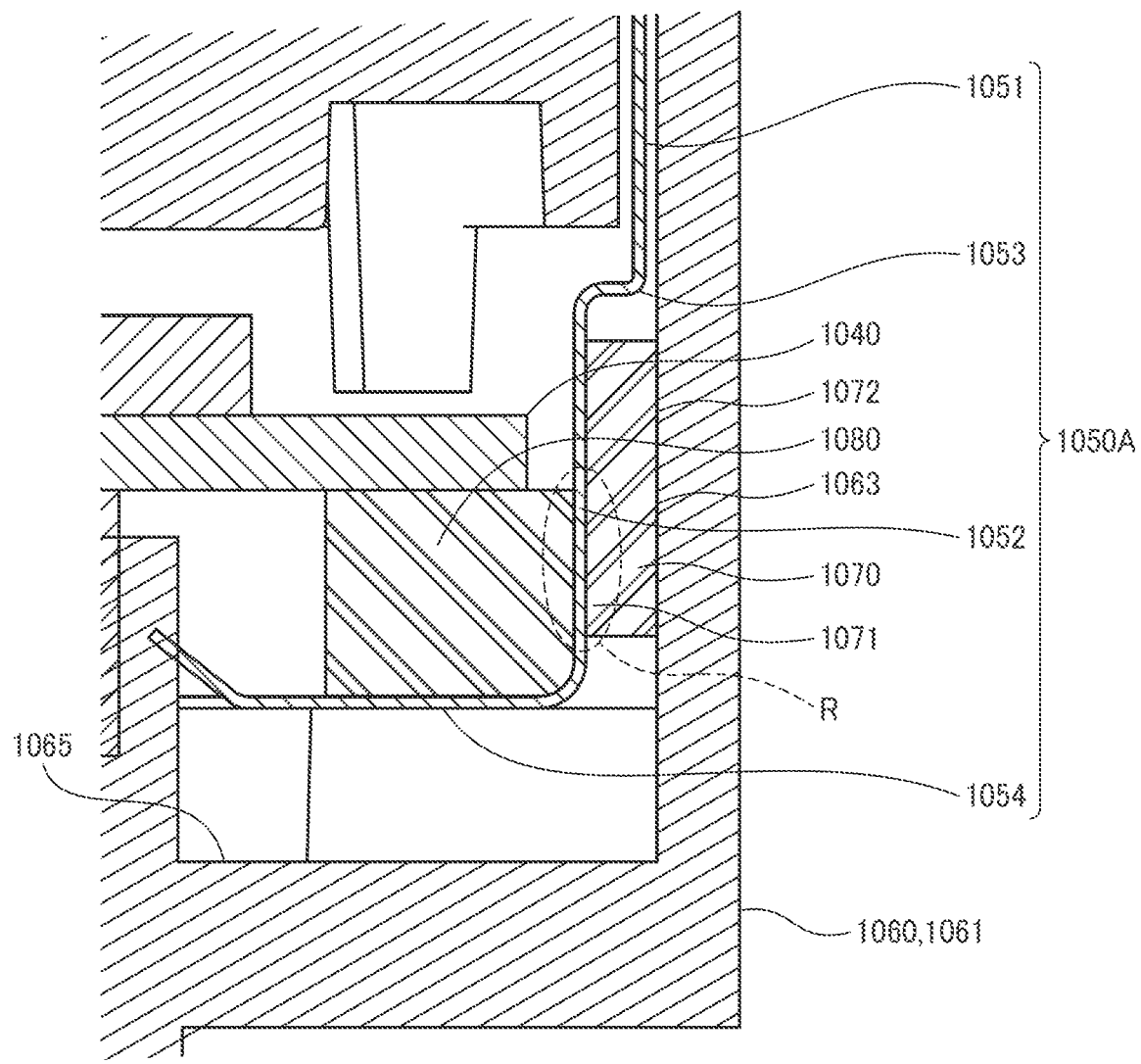
FIG. 15 is an enlarged view of a region a in FIG. 14.

FIG. 14 is a cross-sectional view of a vehicular camera 1100A1 according to a modification of the embodiment B2 taken along the line A-A of FIG. 9. FIG. 15 is an enlarged view of a region a in FIG. 14.

In the description of the modification of the embodiment B2, the same components as those of the vehicular camera 1100A according to the embodiment B2 are denoted by the same reference numerals, the description thereof will be simplified or omitted, and different contents will be described.

The vehicular camera 1100A1 according to the modification of the embodiment B2 illustrated in FIGS. 14 and 15 further includes a second resin member 1080 in addition to the resin sheet 1070 as the first resin member. The second resin member 1080 is in contact with at least a part of each of the second surface 1042 of the circuit board 1040 and the second side surface portion 1052. The second resin member 1080 is provided by, for example, potting of resin, and may be provided by other methods. The second resin member 1080 may be made of the same resin as the first resin member, and the second resin member 1080 may be made of a different resin but have the same heat dissipation as that of the first resin member.

Accordingly, the second resin member 1080 is in contact with at least a part of each of the second surface 1042 of the circuit board 1040 and the second side surface portion 1052, and therefore the heat generated by the electronic component such as the circuit board 1040 can be efficiently dissipated.

Further, as illustrated in FIG. 15, the resin sheet 1070 as the first resin member and the second resin member 1080 are disposed to overlap each other in a region R including at least a part of each of the resin sheet 1070 and the second resin member 1080 in the direction along the optical axis L (for example, the direction parallel to the optical axis L). Accordingly, the resin sheet 1070 and the second resin member 1080 can directly conduct the heat to each other in a manner of sandwiching the second side surface portion 1052 in the overlapping region R.

Accordingly, the resin sheet 1070 and the second resin member 1080 are disposed to overlap each other in the region R including at least a part of each of the resin sheet 1070 and the second resin member 1080, and therefore the heat generated by the electronic component such as the circuit board 1040 can be efficiently dissipated. Further, the second resin member 1080 is also in contact with the bottom surface portion 1054 of the shield 1050, and can efficiently dissipate the heat.

Embodiment B3

Figure 16:
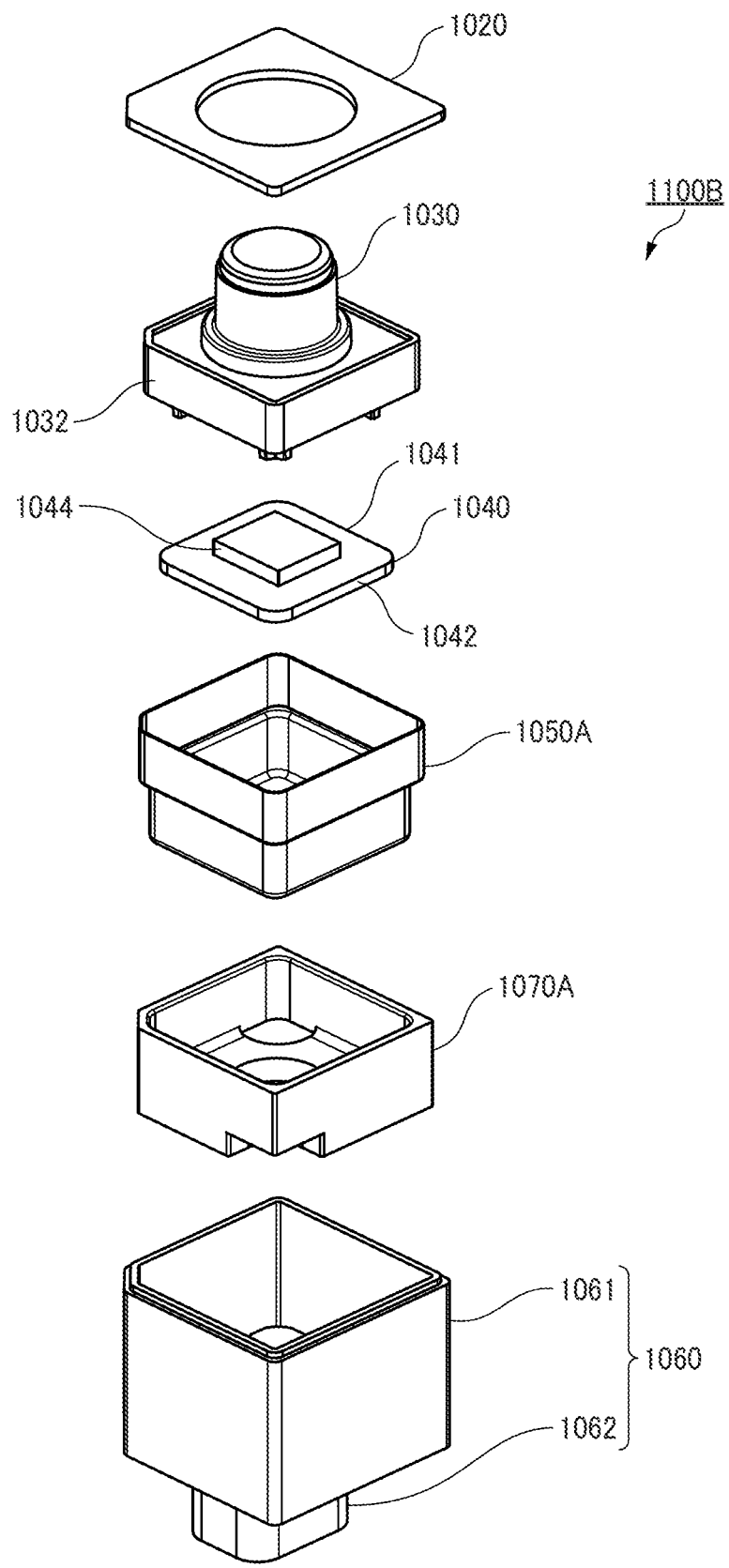
FIG. 16 is an exploded perspective view of a vehicular camera according to the embodiment B3 taken along the line A-A of FIG. 9.
Figure 17A:
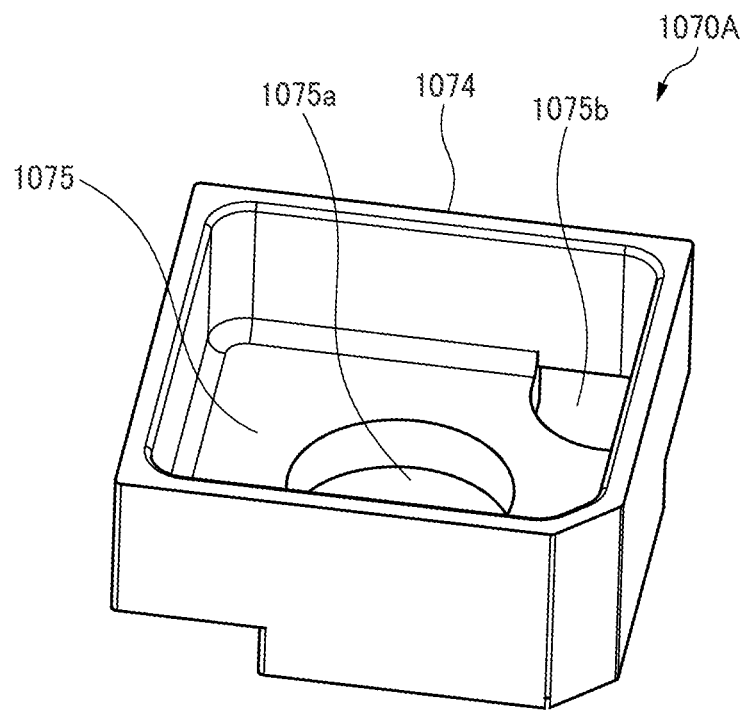
FIG. 17A is a top perspective view of a resin-molded component of the vehicular camera according to the embodiment B3.
Figure 17B:
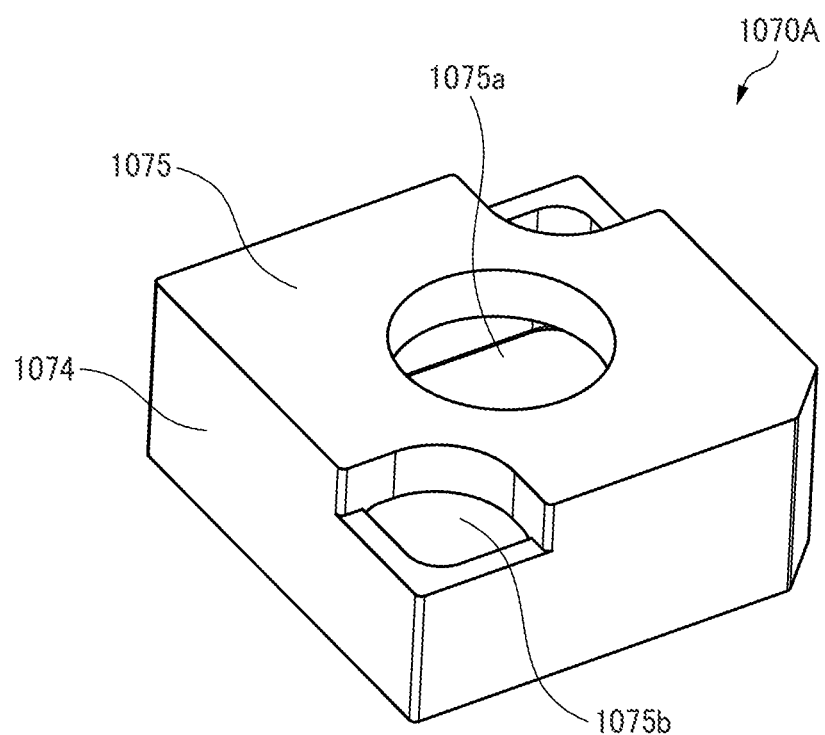
FIG. 17B is a bottom perspective view of the resin-molded component of the vehicular camera according to the embodiment B3.
Figure 18:
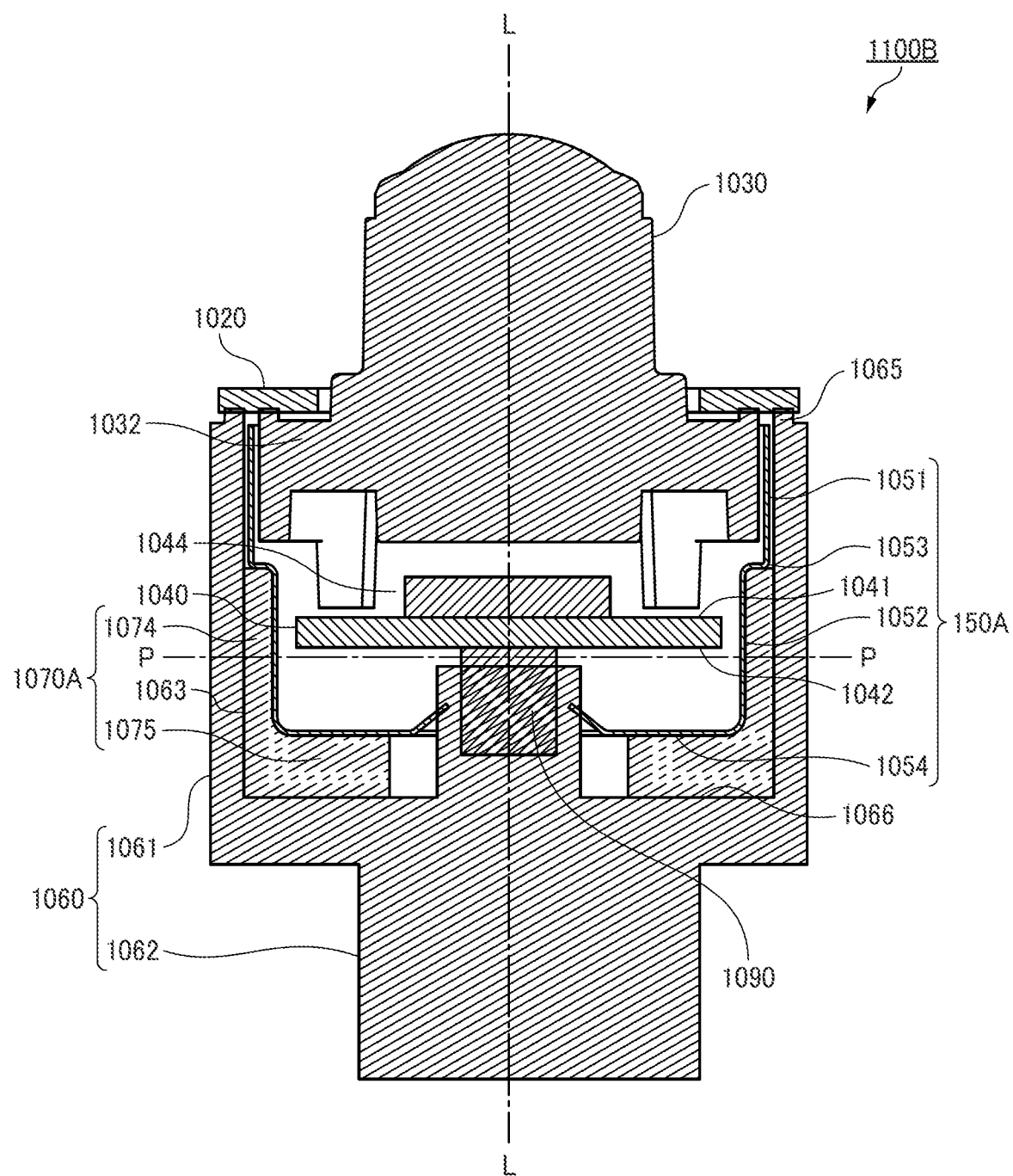
FIG. 18 is a cross-sectional view of the vehicular camera according to the embodiment B3.
Figure 19:
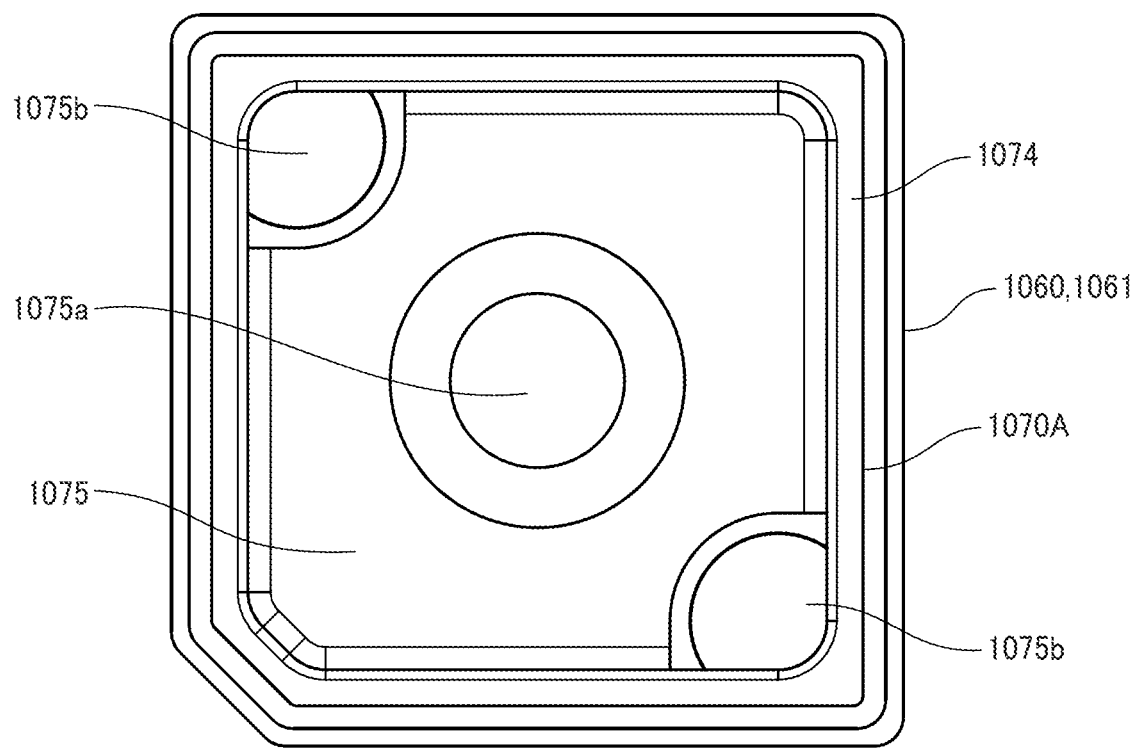
FIG. 19 is a plan view as seen downward from a line P-P of FIG. 18.
Figure 20A:
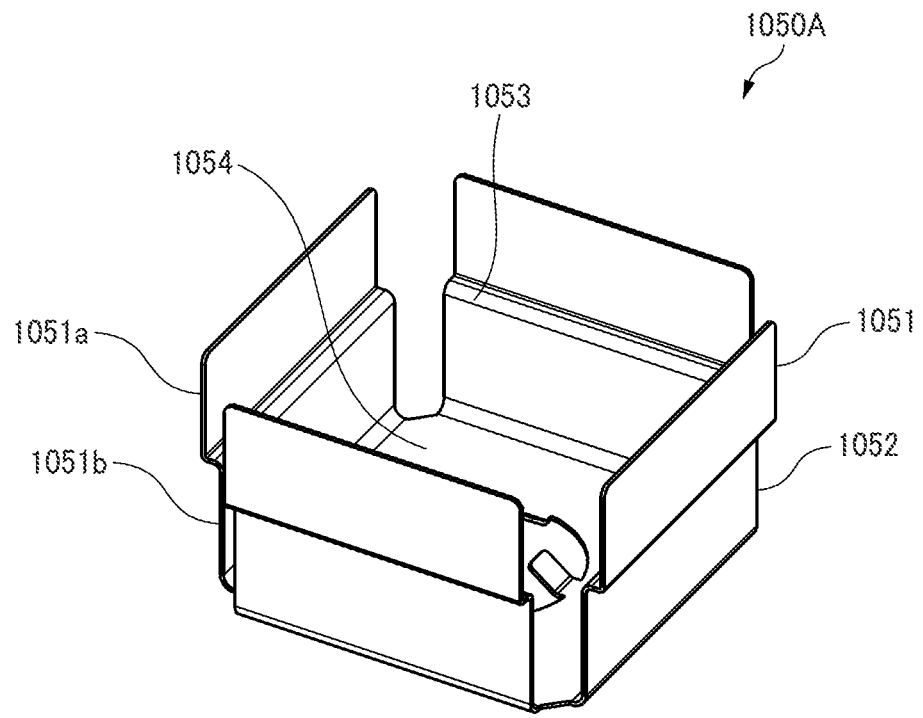
FIG. 20A is a top perspective view of a modification of the shield.
Figure 20B:
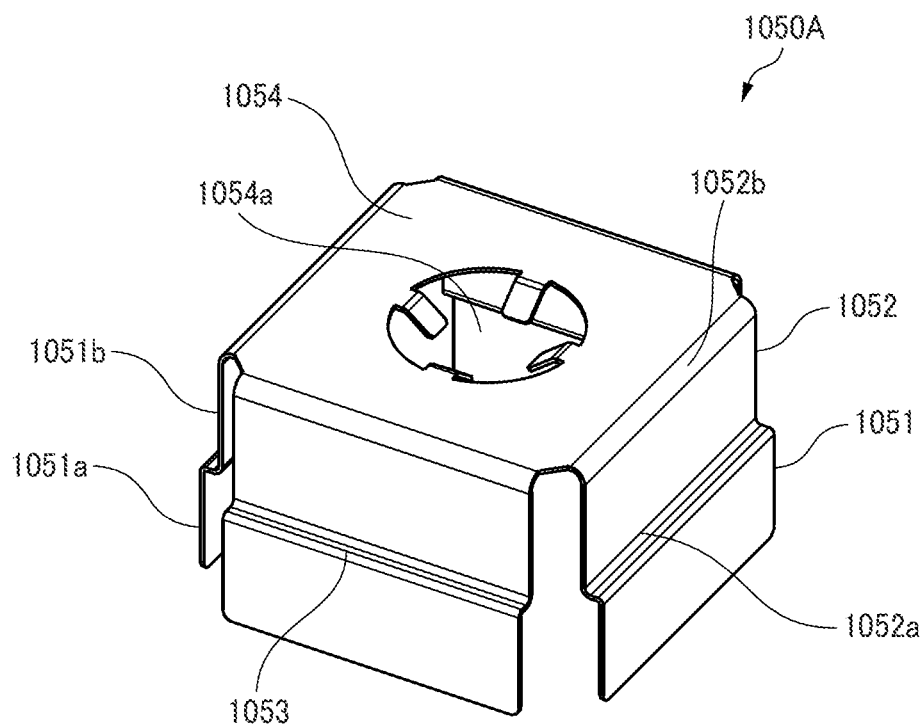
FIG. 20B is a bottom perspective view of the modification of the shield.

FIG. 16 is an exploded perspective view of a vehicular camera 1100B according to an embodiment B3 taken along the line A-A of FIG. 9. FIG. 17A is a top perspective view of a resin-molded component of the vehicular camera 1100B according to the embodiment B3. FIG. 17B is a bottom perspective view of the resin-molded component of the vehicular camera 1100B according to the embodiment B3. FIG. 18 is a cross-sectional view of the vehicular camera 1100B according to the embodiment B3. FIG. 19 is a plan view when seen downward from a line P-P of FIG. 18. FIG. 20A is a top perspective view of a modification of the shield. FIG. 20B is a bottom perspective view of the modification of the shield.

In the description of the embodiment B3, the same components as those of the vehicular camera 1100 according to the embodiment B1 or the vehicular camera 1100A according to the embodiment B2 are denoted by the same reference numerals, the description thereof will be simplified or omitted, and different contents will be described.

As illustrated in FIGS. 16 to 19, a vehicular camera 1100B according to the embodiment B3 includes a resin-molded component 1070A as the first resin member instead of the resin sheet 1070 according to the embodiment B2. As illustrated in FIGS. 17A and 17B, the resin-molded component 1070A includes a flat plate-shaped resin bottom portion 1075 formed along the plane intersecting with the optical axis L (see FIGS. 9 and 18) (for example, the plane orthogonal to the optical axis L), and a resin wall portion 1074 extending from the periphery of the resin bottom portion 1075 in a direction along the optical axis L. The direction along the optical axis L is, for example, a direction parallel to the optical axis L. The resin-molded component 1070A is a component formed in advance by injection molding, for example.

As illustrated in FIG. 18, similar to the resin sheet 1070 according to the embodiment B2, the resin wall portion 1074 is disposed between the side wall inner surface 1063 of the housing portion 1060 and the second side surface portion 1052 of the shield 1050A. Accordingly, the resin wall portion 1074 of the resin-molded component 1070A is in close contact with the side wall inner surface 1063 of the housing portion 1060 and the second side surface portion 1052 of the shield 1050A, and therefore the heat generated by the electronic component such as the circuit board 1040 can be efficiently dissipated.

The resin wall portion 1074 of the resin-molded component 1070A is continuously formed to surround the periphery of the optical axis L. That is, the resin wall portion 1074 continuously surrounds the periphery of the optical axis L and further the circuit board 1040. Accordingly, the resin-molded component 1070A can efficiently dissipate the heat generated by the electronic component such as the circuit board 1040 without any deviation.

The housing portion 1060 is located on a side opposite to the lens barrel portion 1030 in a direction of the optical axis L, and includes a bottom surface 1066 of the space for accommodating the circuit board 1040 and the shield 1050A. On the other hand, as illustrated in FIG. 18, the shield 1050A includes a bottom surface portion 1054 extending, toward the optical axis L, from a second end portion 1052b on a side opposite to a first end portion 1052a of the second side surface portion 1052 connected to the connection portion 1053.

Here, as illustrated in FIG. 18, the resin wall portion 1074 of the resin-molded component 1070A is in contact with the bottom surface portion 1054 of the shield 1050A and the bottom surface 1066 of the housing portion 1060. Accordingly, the heat generated by the electronic component such as the circuit board 1040 can be efficiently dissipated.

Further, as illustrated in FIGS. 17A, 17B, and 19, in the resin bottom portion 1075 of the resin-molded component 1070A, a connector through-hole 1075a through which the connector 1090 inserted from the end of the housing portion 1060 and connected to the circuit board 1040 passes, and screw through-holes 1075b through which an attachment screw for attaching the housing portion 1060 to an external member such as the vehicle body pass are formed. The connector through-hole 1075a is formed, for example, at the center of the resin bottom portion 1075, and the screw through-holes 1075b are formed, for example, at two opposing corner portions on a diagonal line of the resin bottom portion 1075. Accordingly, the connection to the connector 1090 and the attachment to the external member of the vehicular camera 1100 are facilitated.

As illustrated in FIGS. 12A and 12B, the shield 1050A according to the embodiment B3 described above is formed by drawing a metal material. Accordingly, the shield 1050A can be more easily formed from an integral metal material.

However, as illustrated in FIGS. 20A and 20B, the shield 1050A may be formed by bending a metal plate. Accordingly, the shield 1050A can be more easily formed from an integral metal plate.

In the embodiment B3, the first resin member is provided by the resin sheet 1070 or the resin-molded component 1070A, and the first resin member may be achieved by other methods such as potting of resin.

As described above, the resin forming the first resin member (the resin sheet 1070 and the resin-molded component 1070A) and the second resin member 1080 has at least the heat dissipation, and preferably further has a function of absorbing electromagnetic waves. Accordingly, an electromagnetic wave-shielding effect of the shield 1050A can be further enhanced.

As described above, the vehicular camera according to the present disclosure has at least features related to the following matters. The constituent elements corresponding to those in the embodiments described above are described in parentheses, but the present disclosure is not limited thereto.

Embodiment A (A-1) A vehicular camera (the vehicular camera 100) according to the present disclosure includes:
  at least one lens (the lens 32) disposed along an optical axis;
  a lens barrel portion (the lens barrel portion 30) having a first tubular shape and accommodating the at least one lens;
  a planar flange (the welding ring 20) extending in a direction away from the optical axis on an outer periphery of the lens barrel portion;
  a circuit board (the circuit board 40) having a first surface (the first surface 41) and a second surface (the second surface 42) opposite to the first surface;
  an imaging element (the imaging element 50) disposed on the first surface of the circuit board and disposed on the optical axis; and
  a housing (the housing portion 60) at least partially having a second tubular shape and at least accommodating the imaging element and the circuit board, wherein
  the flange is made of a first resin having a first light transmittance with respect to light having a predetermined wavelength, and includes a third surface (the third surface 23), a fourth surface (the fourth surface 24) opposite to the third surface, and at least three protrusions (the protrusions 22) protruding in a direction away from the fourth surface along an optical axis direction on the third surface,
  at least an end surface (the end surface 64) of the second tubular shape of the housing is made of a second resin having a second light transmittance smaller than the first light transmittance with respect to the light having the predetermined wavelength, and is fixed to a fixing region (the first fixing region 24a) of the fourth surface of the flange, and
  on the third surface of the flange, each of the at least three protrusions of the flange is disposed closer to the lens barrel portion than a fixing-corresponding region (the first fixing-corresponding region 23a) of the third surface corresponding to the fixing region of the fourth surface.

Accordingly, in the vehicular camera, the at least three protrusions are in contact with a part of the vehicle and the positional relation with the vehicle is defined, and thus it is possible to eliminate the influence caused by the dimensional error between the vehicular camera and a part of the vehicle and to improve the positioning accuracy of the vehicular camera.

In addition, by changing the height dimension of each protrusion, it is possible to freely adjust the mounting inclination of the vehicular camera with respect to the vehicle.

Further, the protrusions are disposed to avoid the fixing regions and the fixing-corresponding regions, and therefore the protrusions can be fixed in a region where the thickness of the welding ring is uniform when the flange and the lens barrel portion are fixed, and the quality of the fixing can be stabilized. In addition, the damage to the protrusions can be restrained.

(A-2) The vehicular camera according to the present disclosure is the vehicular camera according to (A-1), in which the fixing region of the fourth surface of the flange and the end surface of the second tubular shape of the housing are fixed by laser welding.

Accordingly, in the vehicular camera, the flange can be firmly fixed to the housing.

(A-3) The vehicular camera according to the present disclosure is the vehicular camera according to (A-1), in which
the fixing region of the fourth surface of the flange is defined as a first fixing region (the first fixing region 24a),
the fixing-corresponding region of the third surface of the flange is defined as a first fixing-corresponding region (the first fixing-corresponding region 23a),
the flange is defined as a first flange (the welding ring 20),
the lens barrel portion includes a second flange (the second flange portion 34) that extends in the direction away from the optical axis on the outer periphery of the lens barrel portion and is made of a third resin,
the third resin has a third light transmittance smaller than the first light transmittance with respect to the light having the predetermined wavelength,
the first flange is formed by fixing a ring-shaped member made of the first resin to the second flange,
the ring-shaped member of the first flange has a planar shape including the third surface and the fourth surface,
the fourth surface of the ring-shaped member is fixed to the end surface of the second tubular shape of the housing in the first fixing region, and is fixed to the second flange in a second fixing region (the second fixing region 24b), and
on the third surface, each of the at least three protrusions of the first flange is disposed closer to the lens barrel portion than a second fixing-corresponding region (the second fixing-corresponding region 23b) of the third surface corresponding to the second fixing region of the fourth surface.

Accordingly, in the vehicular camera, the second flange of the lens barrel portion and the end surface of the housing are fixed to the first flange, and therefore the lens barrel portion, the first flange, and the housing can be assembled integrally.

Further, the protrusions are disposed to avoid the first fixing region, the first fixing-corresponding region, the second fixing region and the second fixing-corresponding region, and therefore the protrusions can be fixed in the region where the thickness of the welding ring is uniform, and the quality of the fixing can be stabilized. In addition, the damage to the protrusions can be restrained when the first flange, the lens barrel portion and the housing are fixed.

(A-4) The vehicular camera according to the present disclosure is the vehicular camera according to (A-3), in which
the second fixing region of the fourth surface of the first flange and the second flange are fixed by laser welding.

Accordingly, in the vehicular camera, the first flange and the second flange can be firmly fixed to each other.

(A-5) The vehicular camera according to the present disclosure is the vehicular camera according to (A-3), in which
the second fixing region is located closer to the lens barrel portion than the first fixing region.

Accordingly, in the vehicular camera, the lens barrel portion and the first flange can be firmly fixed to each other inside the housing.

(A-6) The vehicular camera according to the present disclosure is the vehicular camera according to (A-1), in which each of the at least three protrusions has a predetermined height in the optical axis direction.

Accordingly, in the vehicular camera, the positioning accuracy of the vehicular camera can be improved.

(A-7) The vehicular camera according to the present disclosure is the vehicular camera according to (A-1), in which
a first cross section of the first tubular shape of the lens barrel portion, which is orthogonal to the optical axis direction, has a circular shape,
a second cross section of the second tubular shape of the housing, which is orthogonal to the optical axis direction, has a quadrangular shape, and
each of the at least three protrusions is disposed corresponding to a corner of the quadrangular shape.

Accordingly, in the vehicular camera, the vehicular camera can be stably positioned with respect to a part of the vehicle.

(A-8) The vehicular camera according to the present disclosure is the vehicular camera according to (A-7), in which
the quadrangular shape of the second cross section in the housing has a notch (the notch 66) at at least one corner, and
one of the at least three protrusions, which is disposed corresponding to the at least one corner where the notch is provided, is disposed closer to the lens barrel portion than another one of the at least three protrusions disposed corresponding to a corner where no notch is provided.

Accordingly, in the vehicular camera, it is possible to attach the vehicular camera to a part of the vehicle while maintaining the arrangement of the protrusions and securing a correct posture of the vehicular camera by the notch.

(A-9) The vehicular camera according to the present disclosure is the vehicular camera according to (A-1), in which
four protrusions (the protrusions 22a, 22b, 22c, and 22d) are provided.

Accordingly, in the vehicular camera, the vehicular camera can be further stably positioned with respect to a part of the vehicle.

(A-10) The vehicular camera according to the present disclosure is the vehicular camera according to (A-1), in which
each of the at least three protrusions is configured to be in contact with a part (the vehicle body 200) of the vehicle.

Accordingly, in the vehicular camera, the at least three protrusions are in contact with a part of the vehicle and the positional relation with the vehicle is defined, and thus it is possible to eliminate the influence caused by the dimensional error between the vehicular camera and a part of the vehicle and to improve the positioning accuracy of the vehicular camera.

In addition, by changing the height dimension of each protrusion, it is possible to freely adjust the mounting inclination of the vehicular camera with respect to the vehicle.

Embodiments B1, B2, and B3

(B-1) A vehicular camera (the vehicular cameras 1100A, 1100A1, 1100B) includes:
a lens barrel portion (the lens barrel portion 1030) accommodating at least one lens disposed along an optical axis (the optical axis L);

a circuit board (the circuit board 1040) having a first surface (the first surface 1041) and a second surface (the second surface 1042) opposite to the first surface;

an imaging element (the imaging element 1044) disposed on the first surface of the circuit board and disposed on the optical axis;

a housing (the housing portion 1060) to which the lens barrel portion is fixed, which accommodates at least the circuit board and is made of a resin; and a metal shield (the shield 1050A) accommodated in the housing, in which the shield includes a first side surface portion (the first side surface portion 1051) disposed to be adjacent to a side wall inner surface (the side wall inner surface 1063) of the housing, and extending in a direction along the optical axis, a second side surface portion (the second side surface portion 1052) disposed closer to the optical axis than the first side surface portion, and extending in the direction along the optical axis, and a connection portion (the connection portion 1053) connecting the first side surface portion and the second side surface portion, the vehicular camera further includes a first resin member (the resin sheet 1070, the resin-molded component 1070A) disposed between the side wall inner surface of the housing and the second side surface portion, and the first resin member is in contact with at least a part of each of the side wall inner surface of the housing and the second side surface portion.

Accordingly, in the vehicular camera, the first resin member is in contact with at least a part of each of the side wall inner surface of the housing and the second side surface portion of the shield, and therefore heat generated by an electronic component such as the circuit board can be efficiently dissipated. Therefore, the function of the vehicular camera can be maintained. In particular, the function of the imaging element can be maintained.

(B-2) The vehicular camera (the vehicular cameras 1100A and 1100A1) is the vehicular camera according to (B-1), in which the first resin member is constituted by a plate-shaped resin sheet (the resin sheet 1070), and the resin sheet is disposed between the side wall inner surface of the housing and the second side surface portion in a compressed state.

Accordingly, in the vehicular camera, the resin sheet is in close contact with the side wall inner surface of the housing and the second side surface portion of the shield, and therefore the heat generated by the electronic component such as the circuit board can be efficiently dissipated.

(B-3) The vehicular camera (the vehicular cameras 1100A and 1100A1) is the vehicular camera according to (B-2), in which the first resin member includes a plurality of the resin sheets, and the plurality of resin sheets are disposed to surround the periphery of the optical axis.

Accordingly, in the vehicular camera, the resin sheet can efficiently dissipate the heat generated by the electronic component such as the circuit board without any deviation.

(B-4) The vehicular camera (the vehicular cameras 1100A and 1100A1) is the vehicular camera according to (B-2), in which the resin sheet has an inner surface (the inner surface 1071) facing the second side surface portion, and an outer surface (the outer surface 1072) facing the side wall inner surface, the entire inner surface is in contact with the second side surface portion, and the entire outer surface is in contact with the side wall inner surface.

Accordingly, in the vehicular camera, the two opposing surfaces of the resin sheet are in close contact with the side wall inner surface of the housing and the second side surface portion of the shield as a whole, and therefore the heat generated by the electronic component such as the circuit board can be efficiently dissipated.

(B-5) The vehicular camera (the vehicular camera 1100B) is the vehicular camera according to (B-1), in which the first resin member is constituted by a resin-molded component (the resin-molded component 1070A) having a resin wall portion (the resin wall portion 1074) disposed between the side wall inner surface of the housing and the second side surface portion.

Accordingly, in the vehicular camera, the resin wall portion of the resin-molded component is in close contact with the side wall inner surface of the housing and the second side surface portion of the shield, and therefore the heat generated by the electronic component such as the circuit board can be efficiently dissipated.

(B-6) The vehicular camera (the vehicular camera 1100B) is the vehicular camera according to (B-5), in which the resin wall portion of the resin-molded component is continuously formed to surround the periphery of the optical axis.

Accordingly, in the vehicular camera, the resin-molded component can efficiently dissipate the heat generated by the electronic component such as the circuit board without any deviation.

(B-7) The vehicular camera (the vehicular camera 1100B) is the vehicular camera according to (B-5), in which the resin-molded component includes a resin bottom portion (the resin bottom portion 1075) that is formed along an intersecting surface intersecting with the optical axis, and on which the resin wall portion extends from the periphery, the housing is located on a side opposite to the lens barrel portion in the optical axis direction, and has a bottom surface (the bottom surface 1066) of a space for accommodating the circuit board and the shield, the shield includes a bottom surface portion (the bottom surface portion 1054) extending, toward the optical axis, from a second end portion (the second end portion 1052b) on a side opposite to a first end portion (the first end portion 1052a) of the second side surface portion connected to the connection portion, and the resin bottom portion is in contact with the bottom surface portion of the shield and the bottom surface of the housing.

Accordingly, in the vehicular camera, the resin bottom portion of the resin-molded component is in close contact with the bottom surface portion of the shield and the bottom surface of the housing, and therefore the heat generated by the electronic component such as the circuit board can be efficiently dissipated.

(B-8) The vehicular camera (the vehicular camera 1100B) is the vehicular camera according to (B-7), in which in the resin bottom portion of the resin-molded component, a connector through-hole (the connector through-hole 1075a) through which a connector (the connector 1090) inserted from an end of the housing and connected to the circuit board passes, and a screw through-hole (the screw through-holes 1075b) through which an attachment screw for attaching the housing to an external member passes are formed.

Accordingly, in the vehicular camera, the connection to the connector and the attachment to the external member are facilitated.

(B-9) The vehicular camera (the vehicular cameras 1100A, 1100A1, and 1100B) is the vehicular camera according to (B-1), the vehicular camera further includes:

a second resin member (the second resin member 1080) that is in contact with at least a part of each of the second surface of the circuit board and the second side surface portion.

Accordingly, in the vehicular camera, the second resin member is in contact with at least a part of each of the second surface of the circuit board and the second side surface portion of the shield, and therefore the heat generated by the electronic component such as the circuit board can be efficiently dissipated.

(B-10) The vehicular camera (the vehicular cameras 1100A, 1100A1, and 1100B) is the vehicular camera according to (B-9), in which the first resin member and the second resin member are disposed to overlap each other in a region including at least a part of each of the first resin member and the second resin member in the direction along the optical axis.

Accordingly, in the vehicular camera, the first resin member and the second resin member are disposed to overlap each other in the region including at least a part of each of the first resin member and the second resin member, and therefore the heat generated from the electronic component such as the circuit board can be efficiently dissipated.

(B-11) The vehicular camera (the vehicular cameras 1100A, 1100A1, and 1100B) is the vehicular camera according to (B-1), in which the shield is formed by drawing a metal material.

Accordingly, in the vehicular camera, the shield can be more easily formed from an integral metal material.

(B-12) The vehicular camera (the vehicular cameras 1100A, 1100A1, and 1100B) is the vehicular camera according to (B-1), in which the shield is formed by bending a metal plate.

Accordingly, in the vehicular camera, the shield can be more easily formed from an integral metal plate.

Although the embodiments have been described above with reference to the accompanying drawings, the present disclosure is not limited to such embodiments. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, the constituent elements in the embodiments described above may be combined freely in a range without deviating from the spirit of the invention.

INDUSTRIAL APPLICABILITY

The present disclosure is useful as a vehicular camera that eliminates an influence caused by a dimensional error between the vehicular camera and a part of a vehicle and improves positioning accuracy of the vehicular camera.

What is claimed is:

1. A vehicular camera comprising:
at least one lens disposed along an optical axis;
a lens barrel portion having a first tubular shape and accommodating the at least one lens;
a planar first flange extending in a direction away from the optical axis on an outer periphery of the lens barrel portion;
a circuit board having a first surface and a second surface opposite to the first surface;
an imaging element mounted on the first surface of the circuit board and disposed on the optical axis; and
a housing at least partially having a second tubular shape and at least accommodating the imaging element and the circuit board, wherein
the first flange is made of a first resin having a first light transmittance with respect to light having a predetermined wavelength, and includes a third surface, a fourth surface opposite to the third surface, and at least three protrusions protruding in a direction away from the fourth surface along an optical axis direction on the third surface,
at least an end surface of the second tubular shape of the housing is made of a second resin having a second light transmittance smaller than the first light transmittance with respect to the light having the predetermined wavelength, and is fixed to a first fixing region of the fourth surface of the first flange,
on the third surface of the first flange, each of the at least three protrusions of the first flange is disposed closer to the lens barrel portion than a first fixing-corresponding region of the third surface corresponding to the first fixing region of the fourth surface,
the lens barrel portion includes a second flange that extends in the direction away from the optical axis on the outer periphery of the lens barrel portion and is made of a third resin,
the third resin has a third light transmittance smaller than the first light transmittance with respect to the light having the predetermined wavelength,
the first flange is formed by fixing a ring-shaped member made of the first resin to the second flange,
the ring-shaped member of the first flange has a planar shape including the third surface and the fourth surface,
the fourth surface is fixed to the end surface of the second tubular shape of the housing in the first fixing region, and is fixed to the second flange in a second fixing region, and
on the third surface, each of the at least three protrusions of the first flange is disposed closer to the lens barrel portion than a second fixing-corresponding region of the third surface corresponding to the second fixing region of the fourth surface.

2. The vehicular camera according to claim 1, wherein the first fixing region of the fourth surface of the first flange and the end surface of the second tubular shape of the housing are fixed by laser welding.

3. The vehicular camera according to claim 1, wherein the second fixing region of the fourth surface of the first flange and the second flange are fixed by laser welding.

4. The vehicular camera according to claim 1, wherein the second fixing region is located closer to the lens barrel portion than the first fixing region.

5. The vehicular camera according to claim 1, wherein each of the at least three protrusions has a predetermined height in the optical axis direction.

6. The vehicular camera according to claim 1, wherein
a first cross section of the first tubular shape of the lens barrel portion, which is orthogonal to the optical axis direction, has a circular shape,
a second cross section of the second tubular shape of the housing, which is orthogonal to the optical axis direction, has a quadrangular shape, and
each of the at least three protrusions is disposed corresponding to a corner of the quadrangular shape.

7. The vehicular camera according to claim 6, wherein
the quadrangular shape of the second cross section in the housing has a notch at at least one corner, and
one of the at least three protrusions, which is disposed corresponding to the at least one corner where the notch is provided, is disposed closer to the lens barrel portion than another one of the at least three protrusions disposed corresponding to a corner where no notch is provided.

8. The vehicular camera according to claim 1, wherein four of the protrusions are provided.

9. The vehicular camera according to claim 1, wherein each of the at least three protrusions is in contact with a part of a vehicle.

* * * * *